(12) United States Patent
Farey

(10) Patent No.: US 10,489,299 B2
(45) Date of Patent: Nov. 26, 2019

(54) SYSTEMS AND METHODS FOR CACHING DATA

(71) Applicant: Stormagic Limited, Bristol (GB)

(72) Inventor: Christopher J. Farey, Bristol (GB)

(73) Assignee: STORMAGIC LIMITED, Bristol (GB)

( * ) Notice: Subject to any disclaimer, the term of this patent is extended or adjusted under 35 U.S.C. 154(b) by 0 days.

(21) Appl. No.: 15/457,590

(22) Filed: Mar. 13, 2017

(65) Prior Publication Data

US 2018/0165208 A1   Jun. 14, 2018

Related U.S. Application Data

(60) Provisional application No. 62/432,024, filed on Dec. 9, 2016.

(51) Int. Cl.
| | |
|---|---|
| *G06F 12/0868* | (2016.01) |
| *G06F 12/0888* | (2016.01) |
| *G06F 12/08* | (2016.01) |
| *G06F 12/0871* | (2016.01) |
| *G06F 12/0897* | (2016.01) |

(52) U.S. Cl.
CPC ...... *G06F 12/0868* (2013.01); *G06F 12/0888* (2013.01); *G06F 12/08* (2013.01); *G06F 12/0871* (2013.01); *G06F 12/0897* (2013.01); *G06F 2212/1021* (2013.01); *G06F 2212/1024* (2013.01); *G06F 2212/152* (2013.01); *G06F 2212/154* (2013.01); *G06F 2212/163* (2013.01); *G06F 2212/217* (2013.01); *G06F 2212/222* (2013.01); *G06F 2212/465* (2013.01)

(58) Field of Classification Search
CPC ............................. G06F 3/0685; G06F 3/061
See application file for complete search history.

(56) References Cited

U.S. PATENT DOCUMENTS

| | | | |
|---|---|---|---|
| 2012/0072670 A1 | 3/2012 | Jess | |
| 2012/0185647 A1 | 7/2012 | Dawkins | |
| 2013/0132638 A1* | 5/2013 | Horn | G06F 12/0871 711/103 |

(Continued)

FOREIGN PATENT DOCUMENTS

WO   WO2010/088608 A2   8/2010

OTHER PUBLICATIONS

Stormagic Limited, International Search Report and Written Opinion, PCT/IB2017/001642, dated Mar. 28, 2018, 11 pgs.

*Primary Examiner* — Gary W. Cygiel
(74) *Attorney, Agent, or Firm* — Morgan, Lewis & Bockius LLP

(57) ABSTRACT

The various embodiments described herein include methods, devices, and systems for caching data. In one aspect, a method is performed at a computing system having one or more processors and memory including a plurality of distinct memory types each assigned to a respective memory tier of a plurality of memory tiers based on a read latency of the memory type. The method includes: (1) identifying a plurality of extents, including a first extent, each of the extents comprising a respective set of related data stored within the memory; (2) determining a first read frequency for the first extent; and (3) storing the first extent in a particular memory tier of the plurality of distinct memory tiers based on the determined first read frequency.

28 Claims, 16 Drawing Sheets

(56) References Cited

U.S. PATENT DOCUMENTS

2013/0346672 A1    12/2013   Sengupta
2016/0231928 A1    8/2016   Lewis
2016/0239222 A1    8/2016   Shetty

* cited by examiner

SYSTEMS AND METHODS FOR CACHING DATA

CROSS REFERENCE TO RELATED APPLICATIONS

This application claims priority to U.S. Provisional Application Ser. No. 62432,024, filed Dec. 9, 2016, which is incorporated by reference in its entirety.

TECHNICAL FIELD

This relates generally to caching data, including but not limited to, multi-tiered caching architectures.

BACKGROUND

For years data has typically been stored in fixed-size sectors or disk blocks on hard disk drives (HDDs) having spinning platters with a number of concentric tracks. When data is grouped together in contiguous blocks and tracks it can be accessed relatively quickly, but, if the data is accessed from blocks or tracks at different locations on the disk, access will be much slower, due to relatively large head movements. This can reduce read and write performance significantly (e.g., by a factor of a hundred).

Traditionally application software ran on physical servers, often with a single application per server. Each server would have its own set of disks, so often a single application would have its own set of disks. More recently, however, many servers are virtualized, with clusters of physical servers running multiple virtual servers, each running applications that share disk drives or arrays of disk drives.

When multiple applications are accessing multiple files, these files are likely to be scattered across the disk drives. This means that in a virtualized environment application performance suffers due to the poor performance of the disks as a result of the head movements.

While disk capacity continues to grow exponentially and costs continue to decline, disk random performance has changed very little. Therefore, although large arrays of HDDs may not be required for capacity, they are still necessary to deliver the read performance required by applications or desired by users.

Solid-state storage devices (SSDs) are capable of delivering much higher performance than HDDs, but cost considerably more. In addition, the amount of memory available in servers has increased significantly, so working datasets can be read once from the disk drive and then stored in memory, reducing the number of disk reads.

The lowering of the cost of SSDs and memory allows for hybrid storage systems, using HDDs and the like for capacity but storing frequently accessed data in memory or on SSD. Identifying which data should be stored where, however, is challenging.

Accordingly, there is a need for systems and/or devices with more efficient, accurate, and effective methods for storing data on shared storage systems. Such systems, devices, and methods optionally complement or replace conventional systems, devices, and methods for caching data.

SUMMARY

There is a difference between read caching and write caching. Disk drives and storage arrays often include some form of memory-based write-back cache. This allows a small amount of write data to be staged in cache and then re-ordered so that it can be written to disk in such a way as to minimize disk head movements. In some implementations, writes are cached on an SSD tier and then written back to an HDD tier in the background, in such a way as to minimize HDD head movements.

Read caching is distinct from write caching. The goal with read caching is to have the most frequently accessed data stored in a low-latency memory tier (e.g., flash memory), the next most frequently accessed in medium-latency tier (e.g., SSD), and the remainder in a low-latency tier (e.g., HDD). Effective read caching requires a prediction of which data is likely to be read in the near future. The challenge is identifying the proper data for each tier.

Storage read caching algorithms may be based on processor memory caching algorithms. One technique, implementing a Least Recently Used (LRU) algorithm, is for data which is read to then be retained in cache for a period of time, aging out after a time as new data comes in. If data is re-read while it is in cache it is refreshed, and so does not age as quickly.

The problem with LRU is that, if large amounts of data are being read, the data may not be re-read before it ages out of the cache. For example, the data being read in a single day may amount to a terabyte or more. A 4 GB memory cache would be able to hold 5 minutes' worth of data before it aged out. A simple LRU cache would miss data being accessed every 10 minutes, or 144 times a day. What is needed is a way of looking at data over much longer periods, of the order of hours or days.

Another issue is that an SSD read cache incurs an overhead if all data which is read is added to the cache, since then every read of data not already in the cache will result in a write to the SSD cache. Ideally only data being read reasonably frequently should be added to the SSD cache. Again, what is needed is a way of identifying data which is being re-read frequently, but sometimes with relatively long intervals between reads. For example, a particular set of data may be read many times during the course of a day, but have periods of inactivity between reads. This data should be kept in cache during the periods of inactivity.

A problem with monitoring data access over relatively long periods of time, to determine how and where to most effectively store the data, is the amount of data involved. For example, a system with a relatively low read throughput, averaging 1000 inputs/outputs per second (TOPS), would have around 100,000,000 reads per day. Caching systems need to track these reads without significantly impacting performance. Even recording just minimal information for every read generates significant tracking data, e.g., a day's worth of reads could easily consume several gigabytes of memory.

In some implementations, this problem is addressed by breaking the cache into fixed-sized segments and caching entire segments. However, a large number of small segments still consume a significant memory, and a small number of large segments result in wastage as only a small amount of each segment may actually be being accessed frequently. This is particularly apparent with application or operating system metadata blocks, which may be as small as a single disk block but which may get re-read very frequently.

Thus, it is a challenge to: (1) identify data which is being re-read frequently, even when the intervals between reads may be relatively long; (2) efficiently identify the data without significantly affecting performance and without consuming an excessive amount of memory; and (3) identify the data with minimal wastage (e.g., avoid caching data which is not likely to be re-read).

In some implementations, a read tracker separates the function of identifying data that is a good candidate for caching from the function of caching the data. In some implementations, the read tracker identifies frequently read data, even when the interval between reads is relatively long, and informs one or more caching modules of data that is a candidate for caching.

(A1) In one aspect, some implementations include a method performed at a computing system having one or more processors and memory, the memory including a plurality of distinct memory types each assigned to a respective memory tier of a plurality of memory tiers based on a read latency (also sometimes called read time or access time) of the memory type. The method includes: (1) identifying a plurality of extents, including a first extent, each of the extents comprising a respective set of related data stored within the memory; (2) determining a first read frequency for the first extent; and (3) storing the first extent in a particular memory tier of the plurality of distinct memory tiers based on the determined first read frequency.

(A2) In some implementations of the method of A1, the plurality of distinct memory types comprises a plurality of distinct types of physical memory.

(A3) In some implementations of the method of A2, the plurality of distinct types of physical memory includes hard disk drive (HDD) memory, solid state drive (SSD) memory, and random access memory (RAM).

(A4) In some implementations of the method of A2, the total amount of data that can be stored within each memory tier corresponds to a physical storage size of all memory assigned to the respective memory tier.

(A5) In some implementations of the methods of A1-A4: (1) the memory includes a plurality of memory blocks; and (2) identifying the first extent includes determining which one or more memory blocks of the plurality of memory blocks are being read close in time, and whether the memory blocks being read close in time are located close to one another within the memory.

(A6) In some implementations of the methods of A1-A5, identifying the first extent includes identifying a plurality of data blocks as the first extent.

(A7) In some implementations of the methods of A1-A6, determining the first read frequency for the first extent includes determining a number of reads for the first extent during a preset time interval.

(A8) In some implementations of the method of A7, the preset time interval is one or more hours.

(A9) In some implementations of the method of A7, the preset time interval is one or more days.

(A10) In some implementations of the methods of A7-A9, the method further includes adjusting the preset time interval based on a number of identified extents within the memory.

(A11) In some implementations of the methods of A7-A10, the preset time interval includes a non-tracked time period that is excluded from the determination of the first read frequency.

(A12) In some implementations of the methods of A7-A11: (1) the first extent includes a plurality of data blocks; and (2) determining the number of reads for the first extent includes incrementing the number of reads after access of one or more of the data blocks.

(A13) In some implementations of the methods of A7-A12: (1) the method further includes, after storing the first extent in the particular memory tier: (a) determining an updated read frequency for the first extent; and (b) in accordance with a determination that the updated read frequency is different than the first read frequency, storing the first extent in a second memory tier of the plurality of memory tiers; and (2) the second memory tier is distinct from the particular memory tier.

(A14) In some implementations of the method of A13, the updated read frequency is greater than the first read frequency and the second memory tier corresponds to a lower read latency (e.g., a faster read time) than the particular memory tier.

(A15) In some implementations of the methods of A13-A14, determining the updated read frequency for the first extent occurs when the first extent is accessed (e.g., read).

(A16) In some implementations of the methods of A13-A15, the method further includes periodically updating the first read frequency in accordance with a determination that the first extent has not been recently accessed.

(A17) In some implementations of the methods of A1-A16: (1) the plurality of extents includes a second extent; and (2) the second extent is larger than the first extent.

(A18) In some implementations of the methods of A1-A17, the method further includes storing, within an extent map, extent information for each extent in the plurality of extents.

(A19) In some implementations of the method of A18, the extent information includes: (1) location information for the extent within the memory, (2) a time when the extent was last read, and (3) a read frequency for the extent.

(A20) In some implementations of the methods of A18-A19, the method further includes: (1) determining that the extent map exceeds a predetermined size; and (2) in accordance with the determination that the extent map exceeds the predetermined size, removing a particular extent of the plurality of extents from the extent map, where the particular extent has the lowest read frequency.

(A21) In some implementations of the methods of A1-A20, the identifying and determining operations are performed by a read tracker module.

(A22) In some implementations of the method of A21, the read tracker module is stored within a memory type having the lowest read latency of the plurality of distinct memory types.

(A23) In some implementations of the methods of A21-A22, the storing operations are performed in accordance with instructions from the read tracker module.

(A24) In some implementations of the methods of A21-A23, the memory is partitioned into a plurality of virtual disks, and the read tracker module tracks reads for each of the plurality of virtual disks.

(A25) In some implementations of the method of A24, each virtual disk is assigned to a respective user.

(A26) In some implementations of the methods of A24-A25, the read tracker module separately tracks reads for each of the plurality of virtual disks.

(A27) In some implementations of the methods of A1-A26, the method further includes validating the first extent, the validating including: (1) determining a size of the first extent; (2) after determining the size of the first extent, receiving one or more read requests corresponding to the first extent; (3) determining an amount of the first extent read in response to the one or more read requests; and (4) determining whether the first extent is valid based on a comparison of the determined size of the first extent and the determined amount of the first extent that was read.

(B1) In another aspect, some implementations include a computing system including: (1) memory including a plurality of distinct memory types each assigned to a respective memory tier of a plurality of memory tiers based on a read latency of the memory type; and (2) a read tracker module coupled to the memory, the read tracker module configured to: (a) identify a plurality of extents, including a first extent comprising a set of related data stored within the memory; (b) determine a first read frequency for the first extent; and (c) govern caching of the plurality of extents within the memory, including directing storage of the first extent within a particular memory tier of the plurality of distinct memory tiers based on the determined first read frequency.

In some implementations of the system of B1, the system is configured to perform any of the methods described herein (e.g., A1-A27 described above).

In yet another aspect, some implementations include a computing system including one or more processors and memory coupled to the one or more processors, the memory storing one or more programs configured to be executed by the one or more processors, the one or more programs including instructions for performing any of the methods described herein (e.g., A1-A27 described above).

In yet another aspect, some implementations include a non-transitory computer-readable storage medium storing one or more programs for execution by one or more processors of a computing system, the one or more programs including instructions for performing any of the methods described herein (e.g., A1-A27 described above).

The systems, devices, and methods described herein improve the operation of the storage device by minimizing read latency for frequently read data, thereby increasing the performance of the storage device, and the computer system requesting the data as it does not need to wait as long to receive the requested data. Incorporating multiple types of physical memory devices (e.g., HDD, SSD, and RAM) optimizes both storage capacity and performance while minimizing the cost associated with the lowest read latency physical memory devices. For example, using a combination of HDDs (for storage capacity) and SSDs (for low read latency) is significantly cheaper than using only SSDs (for storage capacity and low read latency).

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Figure 1:
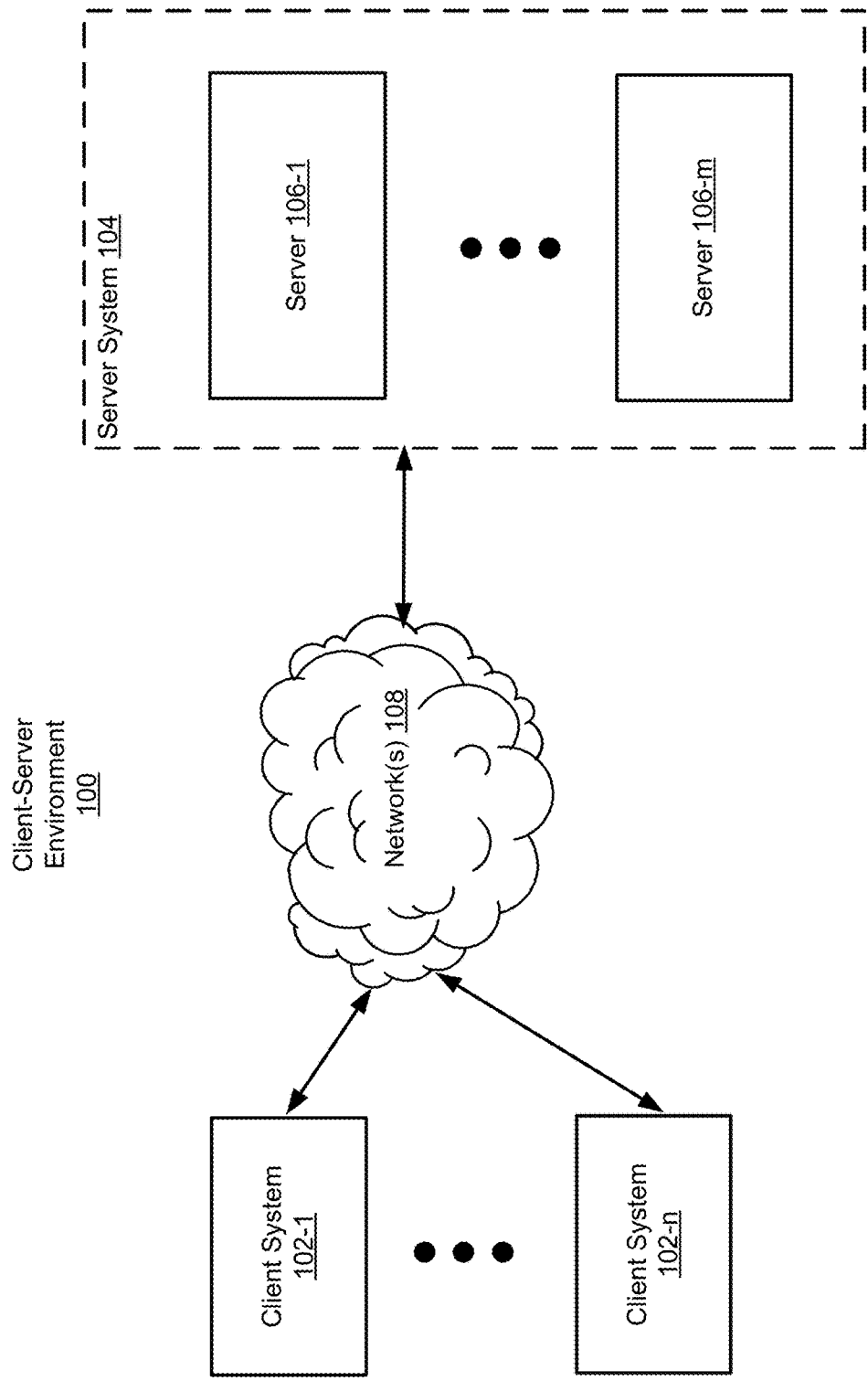
FIG. 1 illustrates a representative client-server environment, in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

The present disclosure involves hybrid systems that use tiered memory storage. For example, HDDs for capacity and flash memory or SSD(s) and RAM for quickly accessing frequently read data. In some implementations, the tiered memory storage includes several classes of storage with different performance and capacity characteristics. In some implementations, the tiered storage includes a small amount of very fast storage (e.g., flash memory), a larger amount of medium performance storage (e.g., SSD), and an even larger amount of slow storage (e.g., HDDs).

In some implementations, the tiered storage includes one or more additional tiers. For example, the tiered storage includes some very fast PCI-based solid-state flash storage, and some slower SSDs accessed via a conventional storage protocol such as SAS or SATA, or some fast Fibre Channel disks along with some slower SATA ones.

In some implementations, one or more tiers of storage have other distinct characteristics. For example, one or more tiers may include volatile memory, where data held within the volatile memory may be lost in the event of a power failure. In some implementations, data cached in volatile memory is also stored in a secondary location within non-volatile memory (e.g., within an HDD).

In some implementations, a read tracker module is used to identify extents of related data in memory and calculate associated read frequencies. In some implementations, the read tracker works with variable-sized extents rather than fixed-size segments. In some implementations, it identifies related data by looking for spatial and temporal locality of access. For example, if data that is contiguous on disk is accessed within a small time window (e.g., 1, 5, or 10 seconds), the read tracker assumes that data is related, and merges it into a larger extent. This is effective because storage servers typically store files in contiguous sequences of blocks and read or write entire files at once.

In general, there is usually a preferred maximum read size (e.g., 64 KB). Accordingly, a 32 MB file may be read in 512 separate reads and those reads may be interleaved with unrelated reads (e.g., read from other applications or virtual machines (VMs) and/or reads of metadata). However, the 512 reads will usually all be issued within a relatively short space of time, and so identifying contiguous data read within a short time window is a good guide to data that should be treated as a single extent. Metadata is often small, typically just a few disk blocks in size, and may be scattered across a disk. In some implementations, reads of metadata will not be merged into larger extents.

In some implementations, the read tracker builds a map of extents read over a period of time (e.g., over a period of hours, days, or weeks). In some instances, the ratio of reads to extents is between 100 and 1000. Thus, even though there may be 100,000,000 reads in a day, for example, the number of separate extents is much smaller. With a day's worth of data mapping onto 1,000,000 extents, it is feasible to maintain extent maps in memory corresponding to several days' worth of data (e.g., with an extent map size of 100 MB, 500 MB, or 1 GB).

In some implementations, once extents have been created the average interval between hits is determined. In some implementations, since an extent is formed from a number of individual reads, it is important to ignore constituent reads that are part of a single large read of an extent. In some implementations, this is done by ignoring reads of an extent that occur within just a few seconds of a previous read. In some implementations, for a read of an extent to count as a hit, it must occur at a time interval greater than a predetermined minimum threshold (e.g., 5, 10, or 15 seconds).

The read tracker identifies which extents are read frequently. In some implementations, this is done by recording the interval between when extents are read and using this to identify the frequency of access. In some implementations, the first time an extent is read, it is assumed to be read slightly less than once per time period (e.g., once per 23 hours if the time period is set to 1 day). In some implementations, when the extent is then read again, the running average of the interval is recalculated. In some implementations, if the extent is then not read for a period, the average interval is re-calculated and the read frequency is reduced. In some implementations, the tracker works with a variable time period (e.g., initially set to 1 day) that grows or shrinks depending on a size of the extent map.

TABLE 1

Example of Read Frequency Calculations

| Number of Reads | Time | Time Period | Estimated Read Interval |
|---|---|---|---|
| 1 | X | 24 hours | 24 hours |
| 2 | X + 1 hour | 24 hours | 12 hours |
| 3 | X + 2 hours | 24 hours | 8 hours |
| 4 | X + 3 hours | 24 hours | 6 hours |

Table 1 shows a estimated read interval for a particular extent in accordance with some implementations. In Table 1 a first read is performed at time X. Based on the first read, the read tracker estimates a read interval equal to the time period, 24 hours. In some implementations, the read tracker estimates a read interval slightly less than the time period (e.g., 23 hours). A second read is performed one hour later (X+1 hour) and the read tracker updates the estimated read interval to 12 hours. Third and fourth reads are performed and the read tracker updates the estimated read interval to 8 hours (after the third read) then 6 hours (after the fourth read). In some implementations, in this way a read frequency is calculated for each extent.

In some implementations, the extents are arranged in tiers, with the most frequently accessed data at the top and the least frequently accessed data at the bottom. An example tier scheme utilizing 8 tiers is shown in Table 2 below.

TABLE 2

Example of Read Frequency Tiers

| Tier | Hits/Period |
|---|---|
| 1 | 1 |
| 2 | 2 |
| 3 | 3-4 |
| 4 | 5-8 |
| 5 | 9-16 |
| 6 | 17-32 |
| 7 | 33-64 |
| 8 | >64 |

In Table 2, the bottom tier contains extents accessed once per period, and is generally the largest tier. In some implementations, as certain extents are accessed more frequently they are promoted to higher tiers, and extents which are accessed less frequently are demoted to lower tiers. In this way, the frequency tiers dynamically evolve as read patterns change. In some embodiments, if the extent map has not reached its maximum allowed size (see below), all stored data is assigned to a single one of the tiers. In some implementations, a set of data is stored in more than one of the tiers.

In some instances, the tracker has a limited amount of memory available for its extent map, so, in some implementations, once the extent map has reached a predetermined size threshold (e.g., 100 MB, 500 MB, or 1 GB) the oldest extents are discarded from the lowest tier. In some implementations, the period for calculating the read frequencies is adjusted. In some implementations, if extents with an average hit interval of greater than the current period are discarded, the length of the period is increased. Conversely, in some implementations, if extents with an average hit interval of less than the current period are discarded, the length of the period is decreased. Thus, in some implementations, the time period used for frequency calculations grows or shrinks based on the memory available to the tracker for the extent map.

In some implementations, the total size of the extents in each tier is calculated to provide an indication of how much cache space is required for the tier. In some implementations, a caching module (e.g., caching module 218, FIG. 2A) with a specific size of cache determines which tiers of extents to cache based on the size of the tiers. For example, if a memory caching module has 4 GB available, and the top two tiers are 1 GB and 3 GB in size, the memory caching module caches the top two tiers (1+3). As another example, if the next 3 tiers totaled 95 GB in size, and an SSD cache had 100 GB available, the caching module caches the top 5 tiers (95+1+3). In some implementations, a read tracker module (e.g., read tracker module 216, FIG. 2A) determines where to cache each tier of extents.

In some instances, it is desirable to disable tracking at certain times. For example, at some storage system locations there may be periods when critical applications are being run and performance must be maximized, and other times when non-critical applications are running. For example, an organization may have a working day and then run back-ups overnight. Accordingly, in some implementations, tracking during certain times is disabled. For example, tracking is disabled either by setting a pre-defined tracking schedule or by allowing an operator to turn it on or off manually.

FIG. 1 illustrates a representative client-server environment 100, in accordance with some implementations. The client-server environment 100 includes a plurality of client systems 102, client system 102-1 through client system 102-*n*, communicatively coupled to a server system 104 via one or more network(s) 108. In some instances and implementations, only a single client system 102 (e.g., client system 102-1) is coupled to the server system 104. The server system 104 includes a plurality of servers 106, server 106-1 through server **106-*m*. In some implementations, the server system 104 includes only a single server 106-1. In some implementations, the server system 104 includes one or more virtual machines. In some implementations, the client systems 102 issue data read and write commands to the server system 104. In some implementations, the client systems 102 issue the commands to a particular server 106. In some implementations, the server system 104 determines which server 106 should process the commands (e.g., which server 106 contains the data to be read). In some implementations, the server system 104 determines the appropriate server 106** based at least in part on load balancing.

Other operations that the client systems 102 may issue, include, but are not limited to: an operation to delete data stored on a target server, an operation to update data stored on a target server, an operation to perform a search query, and any operations involving data. Note that the term "data" is used in this specification to include any type of data (e.g., binary, text, etc.) and also includes metadata (e.g., data about the data).

In some implementations, the server system 104 is a distributed server system. In some implementations, a respective server is a storage node in a cluster of a distributed server system. In some implementations, the respective server is a local server (e.g., in the same data center, the same building, and/or the same geographic location, etc., as the client system). In some implementations, the respective server is a remote server (e.g., in a different data center, different building, and/or different geographic location, etc., as the client system).

A respective client system 102 includes, but is not limited to, a desktop computer system, a laptop computer system, a smart phone, a mobile phone, a tablet computer system, a server, a game console, a set top box, a television set, and any device that can transmit and/or receive data via network 108.

Network 108 optionally includes any type of wired or wireless communication channel capable of coupling together computing systems. This includes, but is not limited to, a local area network, a wide area network, or a combination of networks. In some implementations, network 108 includes the Internet.

In some implementations, a particular server 106 (e.g., server 106-1) includes a plurality of distributed devices. The distributed devices may be located within a single location (e.g., a data center, a building, etc.) or may be geographically distributed across multiple locations (e.g., data centers at various geographical locations, etc.).

Figure 2A:
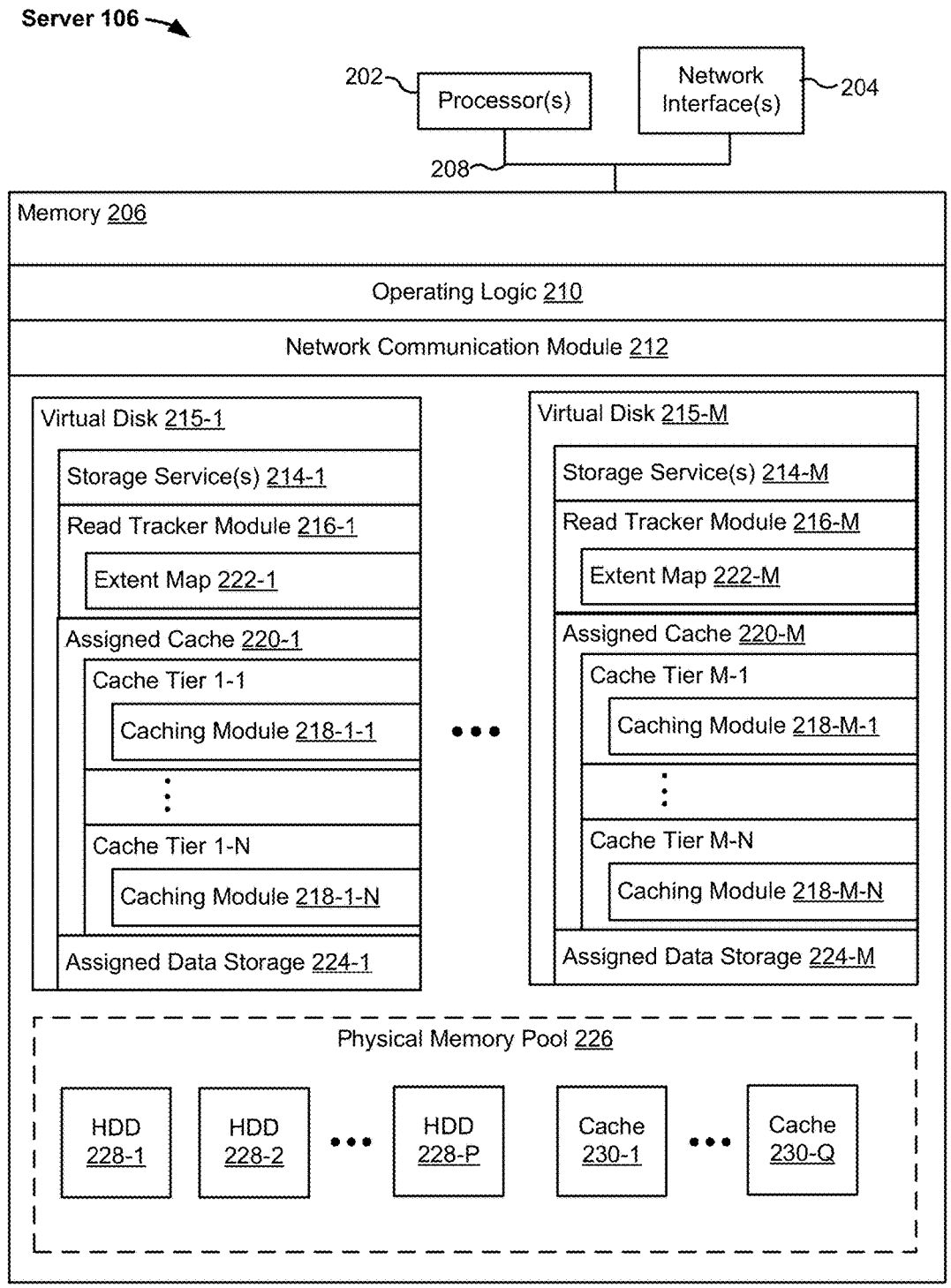
FIGS. 2A-2B are block diagrams illustrating representative storage servers, in accordance with some implementations.

FIG. 2A is block diagram illustrating a representative server 106, in accordance with some implementations. In some implementations, the server 106 includes one or more processing units (e.g., CPUs, ASICs, FPGAs, microprocessors, and the like) 202, one or more network interface(s) 204, memory 206, and one or more communication buses 208 for interconnecting these components (sometimes called a chipset).

In some implementations, the server 106 includes a user interface (not shown). In some implementations, the user interface includes one or more output devices that enable presentation of media content, including one or more speakers and/or one or more visual displays. In some implementations, the user interface also includes one or more input devices, including user interface components that facilitate user input such as a keyboard, a mouse, a voice-command input unit or microphone, a touch screen display, a touch-sensitive input pad, a gesture capturing camera, or other input buttons or controls.

The network interface(s) 204 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.), and/or any of a variety of custom or standard wired protocols (e.g., Ethernet, HomePlug, etc.), or any other suitable communication protocol, including communication protocols not yet developed as of the filing date of this document.

The memory 206 includes volatile memory (e.g., high-speed random access memory), such as DRAM, SRAM, DDR SRAM, or other random access solid state memory devices. The memory 206 further includes non-volatile memory, such as one or more magnetic disk storage devices, one or more optical disk storage devices, one or more flash memory devices, or one or more other non-volatile solid state storage devices. In some implementations, as shown in FIG. 2A, the memory 206 comprises a physical memory pool 226. In some implementations, the physical memory pool 226 a plurality of storage devices 228 (HDD 228-1 through HDD 228-P) and a plurality of caches 230 (cache 230-1 through 230-Q). In some implementations, the caches 230 include distinct types of caches, such as RAM, solid state devices (SSD), and the like.

The memory 206, or alternatively the non-volatile memory within the memory 206, includes a non-transitory computer-readable storage medium. In some implementations, the memory 206, or the non-transitory computer readable storage medium of the memory 206, stores the following programs, modules, and data structures, or a subset or superset thereof:

operating logic 210 including procedures for handling various basic system services and for performing hardware dependent tasks;
 a network communication module 212 for coupling the server 106 to other devices (e.g., storage devices, servers, network devices, and/or client devices 102) via the network interface(s) 204; and
 one or more virtual disk(s) 215 (e.g., virtual disk 215-1 through 215-M) for data storage and caching.

In some implementations, each virtual disk 215 includes a non-transitory computer-readable storage medium. In accordance with some implementations, the virtual disk 215, or the non-transitory computer readable storage medium of the virtual disk 215, stores the following programs, modules, and data structures, or a subset or superset thereof:

one or more storage services 214 for execution by the server 106 (e.g., for mirroring data, snapshotting data, de-duplication of data, and the like);
 a read tracker module 216 for identifying extents, determining read frequencies for extents, and/or governing caching of data within the virtual disk 215, including, but not limited to:
   cache tier information for two or more cache tiers (e.g., cache tier 1 through cache tier N), such as read latency information for each tier, for use with the caching prioritization schemes described herein;
   frequency level information for use with the caching prioritization schemes described herein; and
   an extent map 222 for storing extent information (e.g., memory location and read frequency) for a plurality of extents;

an assigned cache 220 for caching of data within the virtual disk 215, the assigned cache 220 comprising a portion of the caches 230, and organized into a plurality of caching tiers, cache tier 1 through cache tier N, (e.g., arranged based on read latency of each cache 230 assigned to the virtual disk 215), each cache tier including:

one or more caching modules 218 for adding/removing data from one or more memory caches within the particular caching tier (e.g., in conjunction with the read tracker module 216), locating data within the one or more memory caches, and/or reading data from the one or more memory caches; and an assigned database 224 for storing data (e.g., client data, metadata, redundancy data, etc.) within the virtual disk 215, the assigned database 224 comprising a portion of the HDDs 228.

In some implementations, a particular cache tier (e.g., cache tier 1) includes a plurality of distinct memory types. For example a cache tier includes two distinct types of SSDs, and/or includes flash memory and an SSD. In some implementations, the cache tiers are arranged based on read latency (sometimes also called access latency). In some implementations, the cache 220 includes volatile memory (e.g., RAM). In some implementations, the cache 220 includes both volatile and non-volatile memory.

In some implementations, the extent map 222 is stored within a particular tier of the assigned cache 220 (e.g., cache tier 1). In some implementations, the extent map 222 is stored within a cache tier having the lowest read latency.

In some implementations, the caching module 218 includes a plurality of caching sub-modules. In some implementations, each caching sub-module corresponds to a respective physical memory device. In some implementations, each cache 230 has a respective caching module 218 and the caching module 218 handles caching for multiple virtual disks 215.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, memory 206, optionally, stores a subset of the modules and data structures identified above. Furthermore, memory 206, optionally, stores additional modules and data structures not described above. For example, in some implementations, memory 206 stores an input/output processing module for facilitating interactions with one or more users.

Figure 2B:
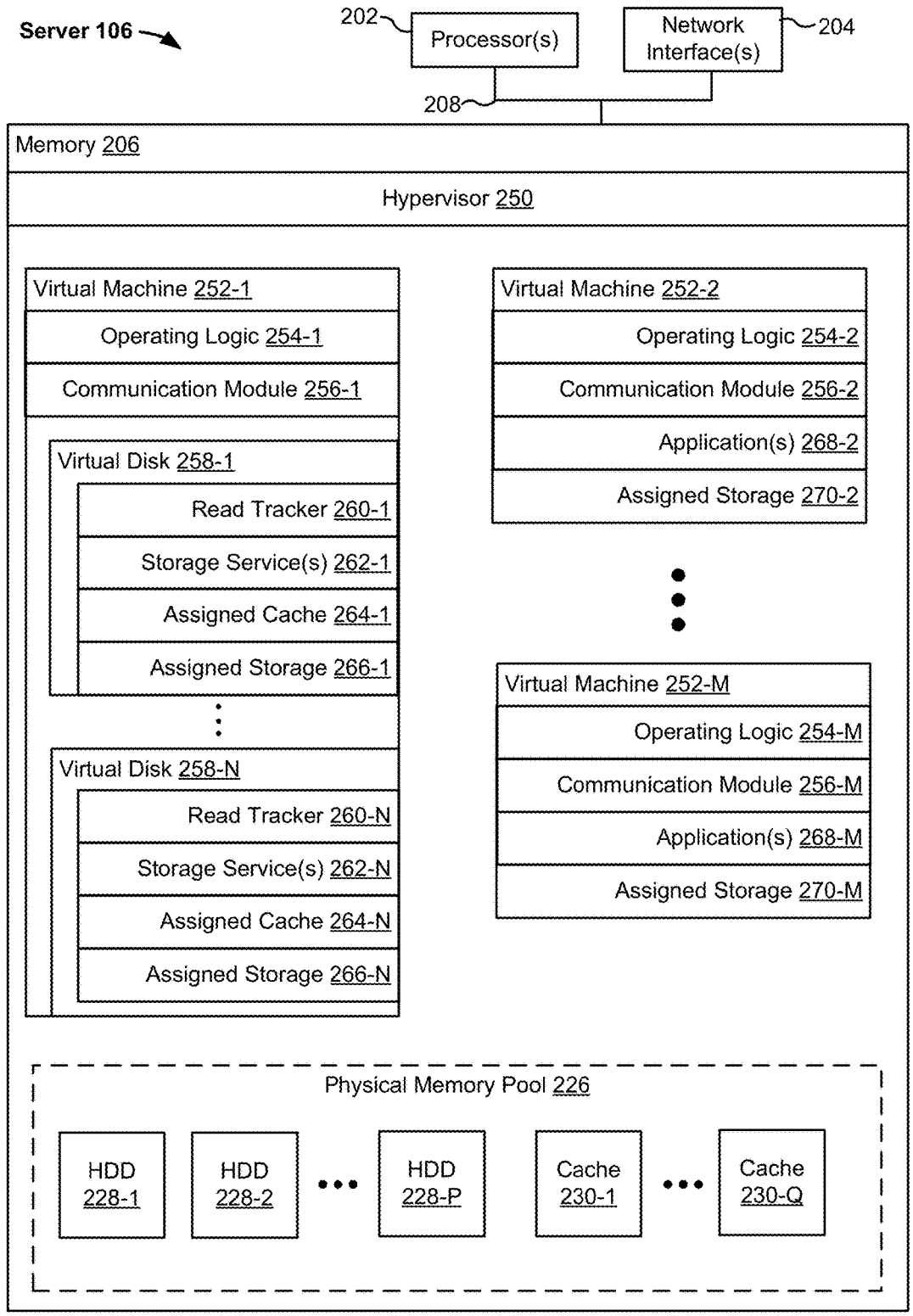

FIG. 2B is block diagram illustrating another representative server 106, in accordance with some implementations. FIG. 2B differs from FIG. 2A in that the server illustrated in FIG. 2B is partitioned into a plurality of virtual machines 252. In FIG. 2B the server 106 includes a hypervisor 250 and plurality of virtual machines 252 (e.g., virtual machine 252-1 and virtual machines 252). The hypervisor 250 manages the various virtual machines 252, and in some implementations, governs communication between the virtual machines 252 and remote devices via the network interface(s) 204. In some implementations, the hypervisor 250 governs creation, formatting, recovery, and/or deletion of virtual machines 252.

In accordance with some implementations, the server 106 includes a virtual storage machine (e.g., virtual machine 252-1) and one or more virtual client machines (e.g., virtual machines 252-2 through 252-M).

Each virtual disk 252 includes respective operating logic 254 and communication module 256. The virtual machine 252-1 comprises operating logic 254-1, communication module 256-1, and virtual disks 258. In some implementations, the virtual machine 252-1 comprises the programs, modules, and data structures, or a subset or superset thereof, of server 106 in FIG. 2A. The virtual machine 252-1 has assigned memory from physical memory pool 226 and the assigned memory is partitioned between the virtual disks 258. In some implementations, at least two of the virtual machines utilize distinct operating logic 254. For example, the virtual machine 252-1 utilizes a storage-specific operating system and the virtual machines 252-2 through 252-M utilize client-oriented operating systems (e.g., iOS or Windows). The virtual machines 252-2 through 252-M each include one or more applications 268 and assigned storage 270. In some implementations, each virtual machine 252 includes a distinct set of application for execution by the server 106 (e.g., storage applications, communication applications, data manipulation applications, and/or other web or non-web based applications). In some implementations, the one or more applications 268 and/or the characteristics of the assigned storage 270 (e.g., size or speed) for each virtual machine 252 are based on permissions of an account associated with the virtual machine.

In accordance with some implementations, each assigned cache 264 in FIG. 2B includes a respective plurality of cache tiers and a respective extent map. In some implementations, a first cache (e.g., cache 264-1) and a second cache (e.g., cache 264-N) have a distinct number of cache tiers. For example, cache 264-1 includes cache tiers 1 through N and cache tier 264-N includes cache tiers 1 through M. In some implementations, the number of cache tiers for each virtual disk 252 are based on one or more of: the amount and types of physical cache available to the virtual disk, the time period over which read frequency is calculated for the virtual disk, the amount of reads performed by the virtual disk during a particular time period, the types of data stored within the virtual disk, and/or user preferences of a user of the virtual disk.

In virtual disk storage systems, the storage server often has little or no knowledge regarding the purpose of the data being stored or the relationship between various data blocks. For example, in a vSphere virtualized environment, the virtual disk may be formatted with a VMFS file system, and within that file system there may be multiple vSphere virtual disks (VMDKs), each assigned to different virtual machines. The VMDKs may then be partitioned and formatted with guest file systems, and within those file systems there will be multiple files and metadata, and possibly other data structures such as databases. Generally, none of this structure is visible to the storage server, which simply sees sequences of reads and writes of sequences of blocks issued by a hypervisor. To effectively cache data it is necessary to identify data relationships, such as blocks of data which constitutes a single file on a guest file system. In some implementations, the identification of data relationships is performed by the read tracker modules 216, as described herein.

Figure 3:
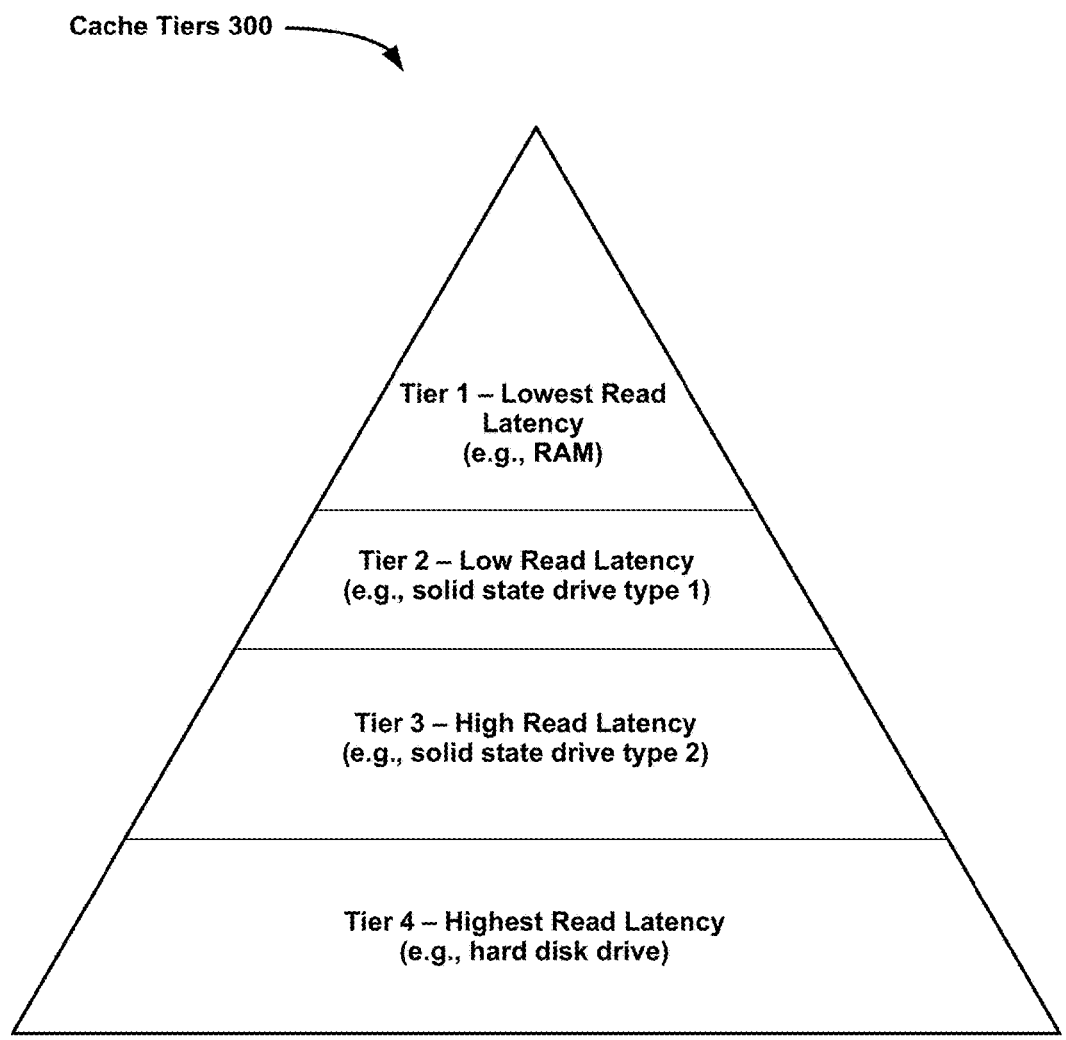
FIG. 3 is a schematic illustrating a representative cache tier arrangement utilizing various types of memory, in accordance with some implementations.

FIG. 3 illustrates a cache tier arrangement 300 utilizing various types of memory, in accordance with some implementations. The cache tier arrangement 300 shown in FIG. 3 includes four tiers of cache. The first tier of the cache, tier 1, has the lowest read latency of all the cache tiers. In some implementations, tier 1 is comprised of volatile memory such as RAM. The second tier of the cache, tier 2, has a read latency higher than the read latency of tier 1. In some implementations, tier 2 is comprised of flash memory or a particular type of SSD. The third tier of the cache, tier 3, has a read latency higher than the read latency of tier 2. In some implementations, tier 3 is comprised of SSD(s). The fourth tier of the cache, tier 4, has the highest read latency of all the cache tiers (e.g., higher than the read latency of tier 3). In some implementations, tier 4 is comprised of HDD(s). In some implementations, a cache tier includes or more less tiers of cache (e.g., cache tiers 1 through N in FIG. 2A).

Figure 4:
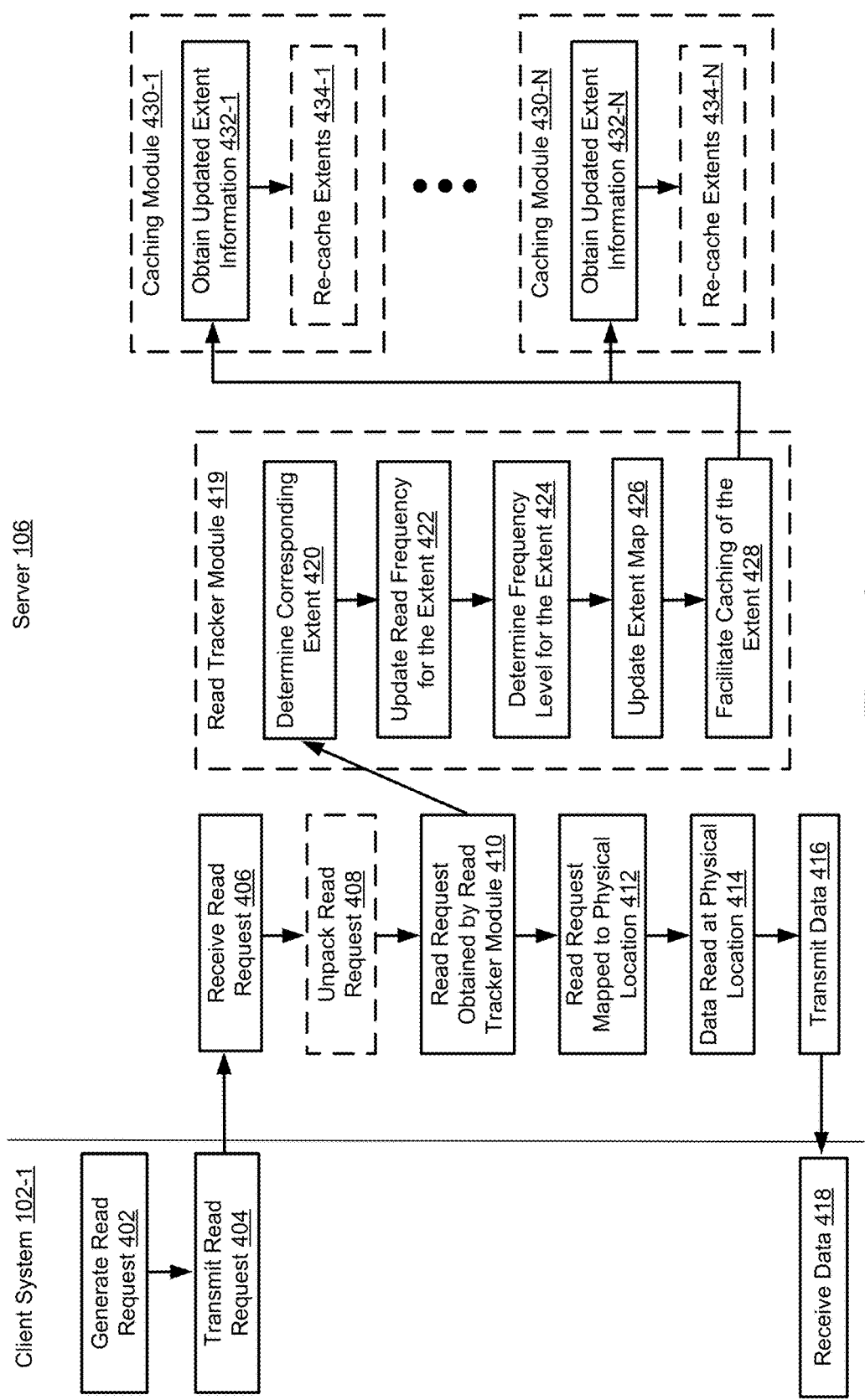
FIG. 4 is a flowchart illustrating a process of executing read requests and updating extent information, in accordance with some implementations.

FIG. 4 illustrates a process of executing read requests and updating extent information, in accordance with some implementations. As shown in FIG. 4, the client system 102-1 (FIG. 1) generates (402) a read request to read data stored at a logical read address within a server 106 (FIG. 1). In some implementations, the read request is an Internet Small Computer System Interface (iSCSI) request. The client system 102-1 transmits (404) the read request to the server 106 (e.g., via network(s) 108, FIG. 1).

The server 106 receives (406) the read request from the client system 102-1 (FIG. 1). In some implementations, the server 106 (FIG. 1) decrypts and/or unpacks (408) the read request. For example, the server 106 extracts a Small Computer System Interface (SCSI) request from a received iSCSI request. The read request with the logical read address is mapped (412) to a physical memory location within the server 106. In some implementations, the read tracker module obtains (410) the read request before it is mapped to a physical location (e.g., the read tracker module obtains the logical address). In some implementations, the read tracker module obtains the read request after it is mapped to the physical location (e.g., the read tracker module obtains the physical read address). The server 106 then reads (414) the data at the physical read address and transmits (416) the data to the client system 102-1 (FIG. 1), fulfilling the read request.

The read tracker module 419 (e.g., read tracker module 216, FIG. 2A) determines (420) an extent corresponding to the read request. In some instances, the read tracker module identifies a new extent having the data referenced in the read request. In some instances, the read tracker modules identifies an existing extent (e.g., using the extent map 222) having the data referenced in the read request. The read tracker module then updates (422) the read frequency for the identified extent. After updating the read frequency, the read tracker module determines (424) a frequency level for the identified extent. The read tracker module also updates the extent map (e.g., extent map 222, FIG. 2A) (426) to reflect the updated read frequency. In some implementations, updating the extent map includes determining a frequency level and/or caching tier for the extent. In some implementations, the read tracker module updates the extent map after determining the frequency level for the extent. In some implementations, the read tracker module governs or facilitates (428) caching of the extent based on the determined frequency level. In some implementations, the read tracker module 419 directs one or more caching modules 430 (e.g., caching modules 218, FIG. 2A) to store the identified extent in a corresponding cache.

One or more of the caching modules 430 (e.g., caching modules 430-1 through 430-N) obtain (432) updated extent information (e.g., the updated extent map). The one or more of the caching modules 430 then re-cache (434) extents based on the updated extent information. In some implementations, the number of extents in a particular cache tier depends on the memory capacity of the memory devices that make up the tier and the amount of memory encompassed in each extent.

Figure 5:
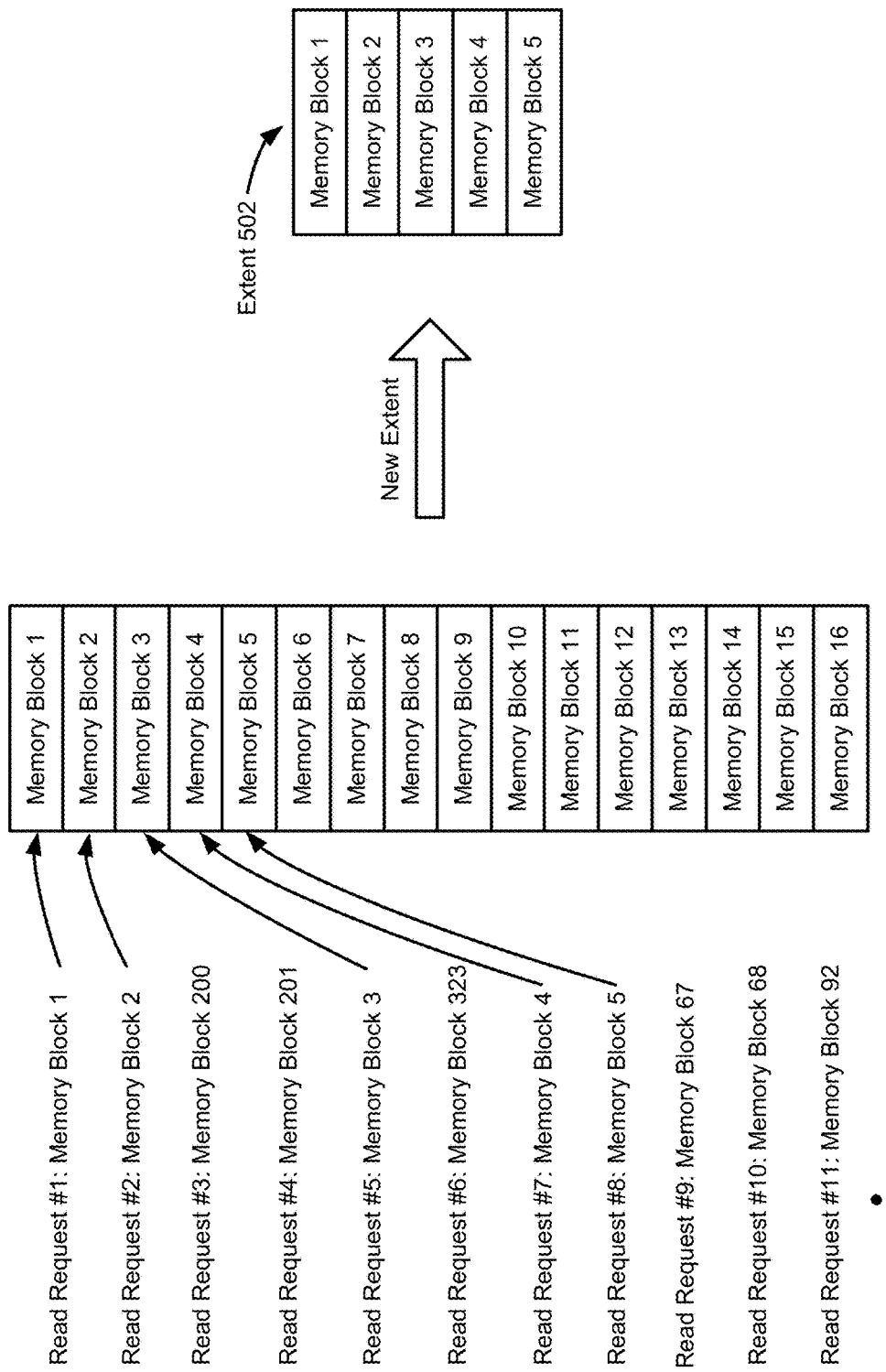
FIG. 5 is a block diagram illustrating a process of identifying a particular extent within memory, in accordance with some implementations.

FIG. 5 illustrates a process of identifying a particular extent within memory, in accordance with some implementations. FIG. 5 shows a series of read requests, read request #1 through read request #11, designating particular memory blocks to be read. The storage server (e.g., server 106-1) or a component thereof (e.g., read tracker module 216) obtains each read request and determines whether the request corresponds to a particular extent. In accordance with some implementations, the storage server determines that read requests correspond to the same extent when: (1) the requests are obtained close in time (e.g., within 3, 5, or 10 seconds) to one another; and (2) the requests designate memory blocks close to one another within the memory (e.g., adjacent to one another or within 1, 3, or 5 memory blocks of one another). In some implementations, read requests correspond to the same extent only when the requests designate continuous memory blocks. In FIG. 5 read requests #1 through #11 are received close in time. Read request #1, read request #2, read request #5, read request #7, and read request #8 designate memory blocks that are close to one another (memory blocks 1, 2, 3, 4, and 5). Read request #3, read request #6, read request #9, read request #1 , and read request #11 designate memory blocks that are not close to the memory blocks designated by read requests #1, #2, #5, and #7. Therefore, a resulting extent 502 includes memory blocks 1, 2, 3, 4, and 5, which are close to one another and were read close in time.

Figure 6:
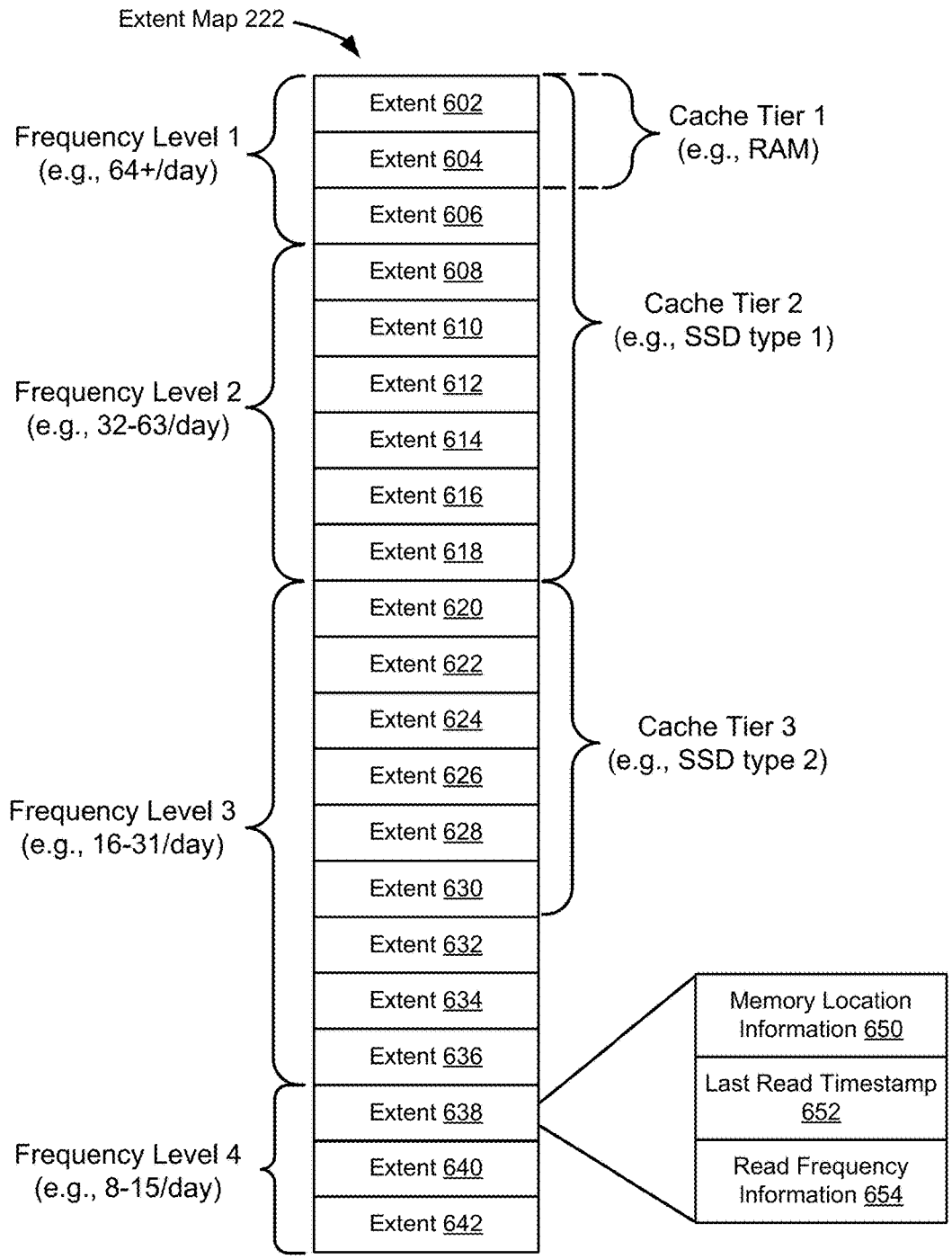
FIG. 6 is a block diagram illustrating a representative extent map, in accordance with some implementations.

FIG. 6 is a block diagram illustrating a representative extent map 222, in accordance with some implementations. Extent map 222 includes a plurality of extents, extent 602 through extent 642, assigned to a plurality of frequency levels, frequency level 1 through frequency level 4. Extents in the extent map 222 are stored within various cache tiers, e.g., cache tier 1 through cache tier 3. Thus, frequency levels are mapped to cache tiers. In some implementations, as shown in FIG. 6, one or more cache tiers corresponding to non-volatile memory (e.g., cache tier 2) overlap in the mapping with cache tiers corresponding to volatile memory (e.g., cache tier 1). Having the non-volatile and volatile cache tiers overlap enables the server (e.g., server 106, FIG. 1) to more quickly recover from a power failure or outage, as the frequently read data can be read from the non-volatile cache tier rather than from the database (e.g., an HDD). In situations and implementations where a particular cache tier (e.g., cache tier 3 in FIG. 6) caches only a portion of a frequency level (e.g., frequency level 3 in FIG. 6), the server (e.g., a caching module of the server) optionally selects the portion of the frequency level based on one or more characteristics of extents assigned to the frequency level (e.g., last read timestamp, extent size, and the like). For example, the cache tier 3 stores a subset of the extents from frequency level 3 that have been read most recently and a fourth cache tier stores the remainder of the extents from frequency level 3.

In accordance with some implementations, each extent in extent map 222 includes memory location information 650, a last read timestamp 652, and read frequency information 654. In some implementations, the memory location information 650 includes a starting memory block address and an ending memory block address. In some implementations, the memory location information 650 includes a starting memory block address and a length (e.g., a number of memory blocks spanned by the extent). In some implementations, the memory location information 650 includes a hash or compressed value of all the memory block locations within the extent. In some implementations, the memory location information 650 includes a listing (or other indicator) of memory blocks within a span that are not included within the extent. In some implementations, the last read timestamp 652 indicates the time (e.g., to the second or millisecond) that at least a portion of the extent was last read. In some implementations, the read frequency information 654 indicates a number of times at least a portion of the extent has been read during a particular time interval (e.g., during the last hour or last day). In some implementations, the read frequency information 654 includes a count of the number of times the extent has been read. In some implementations, the read frequency information 654 includes a relative number of times the extent has been read compared to other extents in the extent map 222.

Figure 7A:
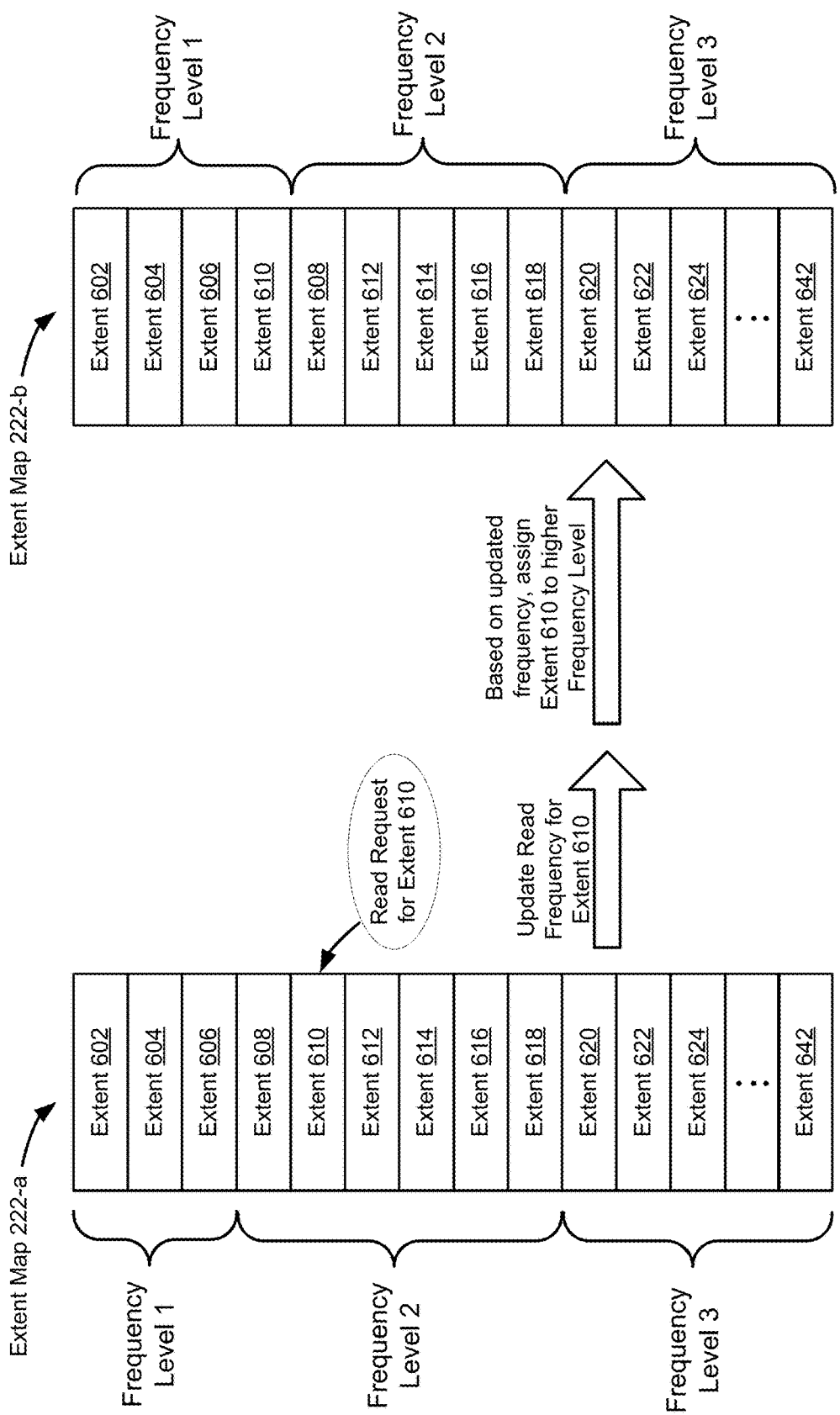
FIGS. 7A-7C are block diagrams illustrating a process of updating an extent map, in accordance with some implementations.
Figure 7B:
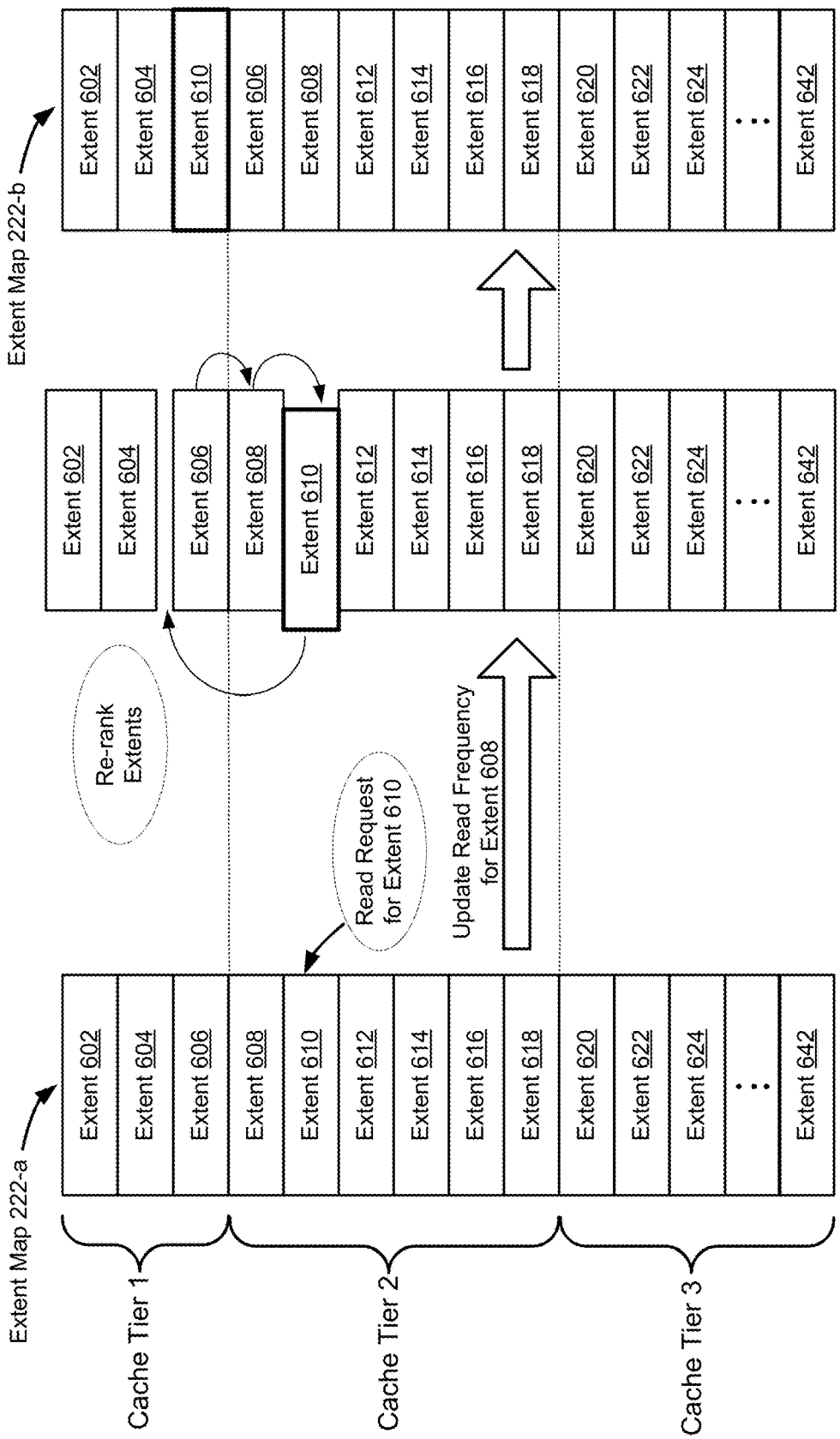
Figure 7C:
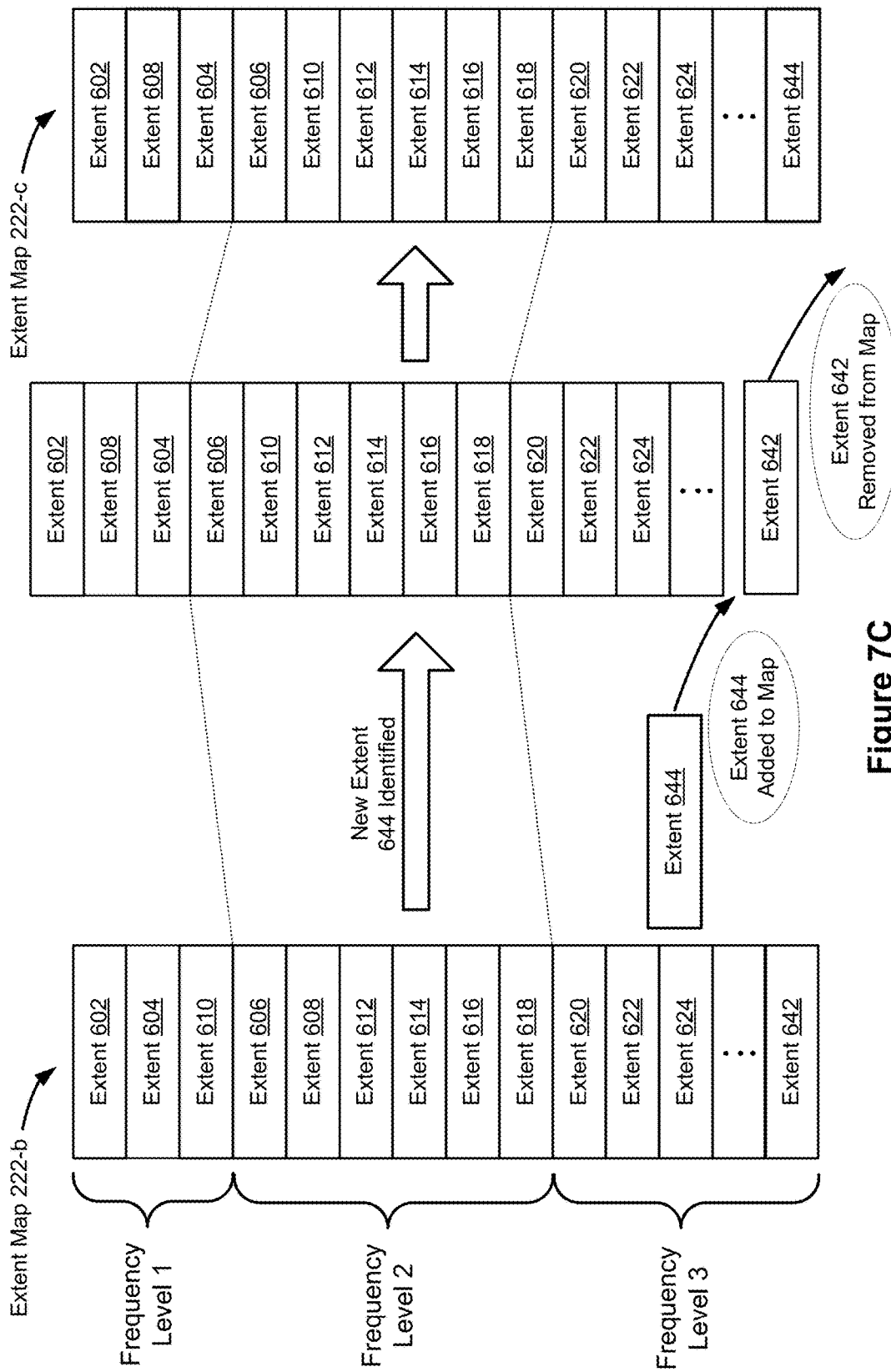
Figure 8A:
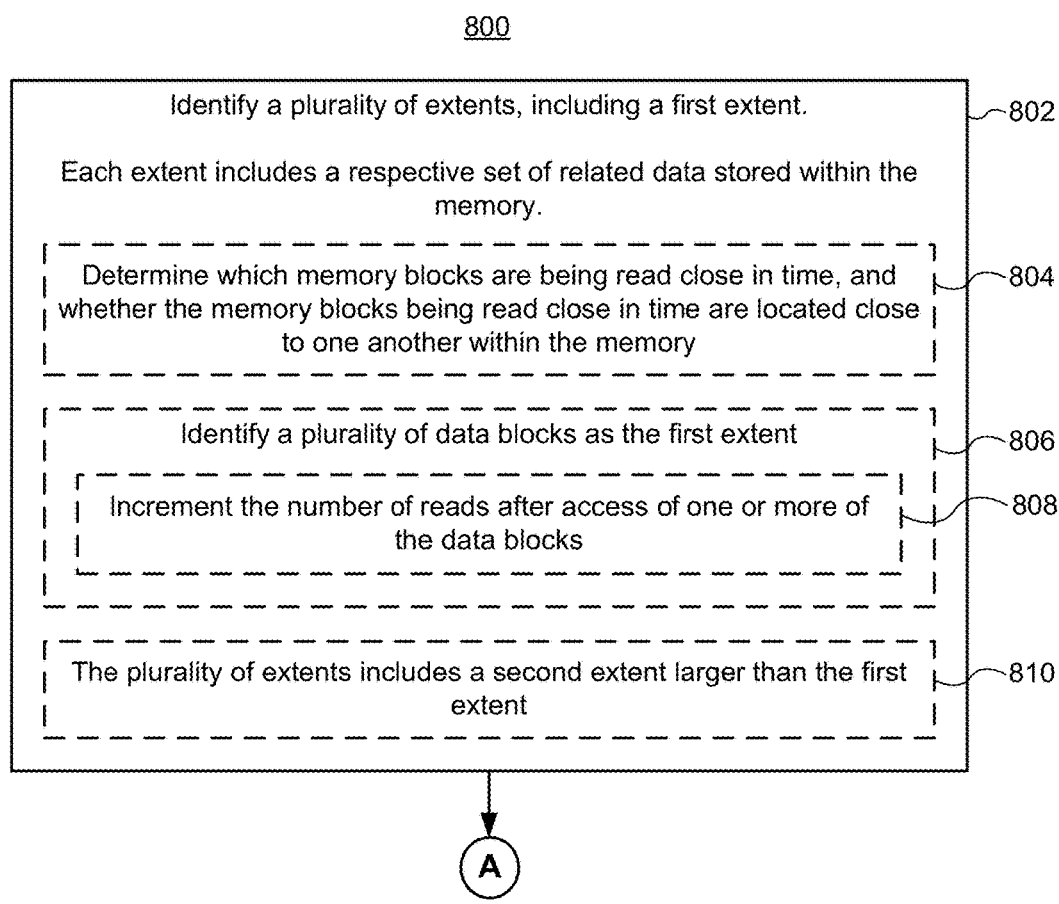
FIGS. 8A-8F are flowcharts illustrating a representative method for caching data, in accordance with some implementations.
Figure 8B:
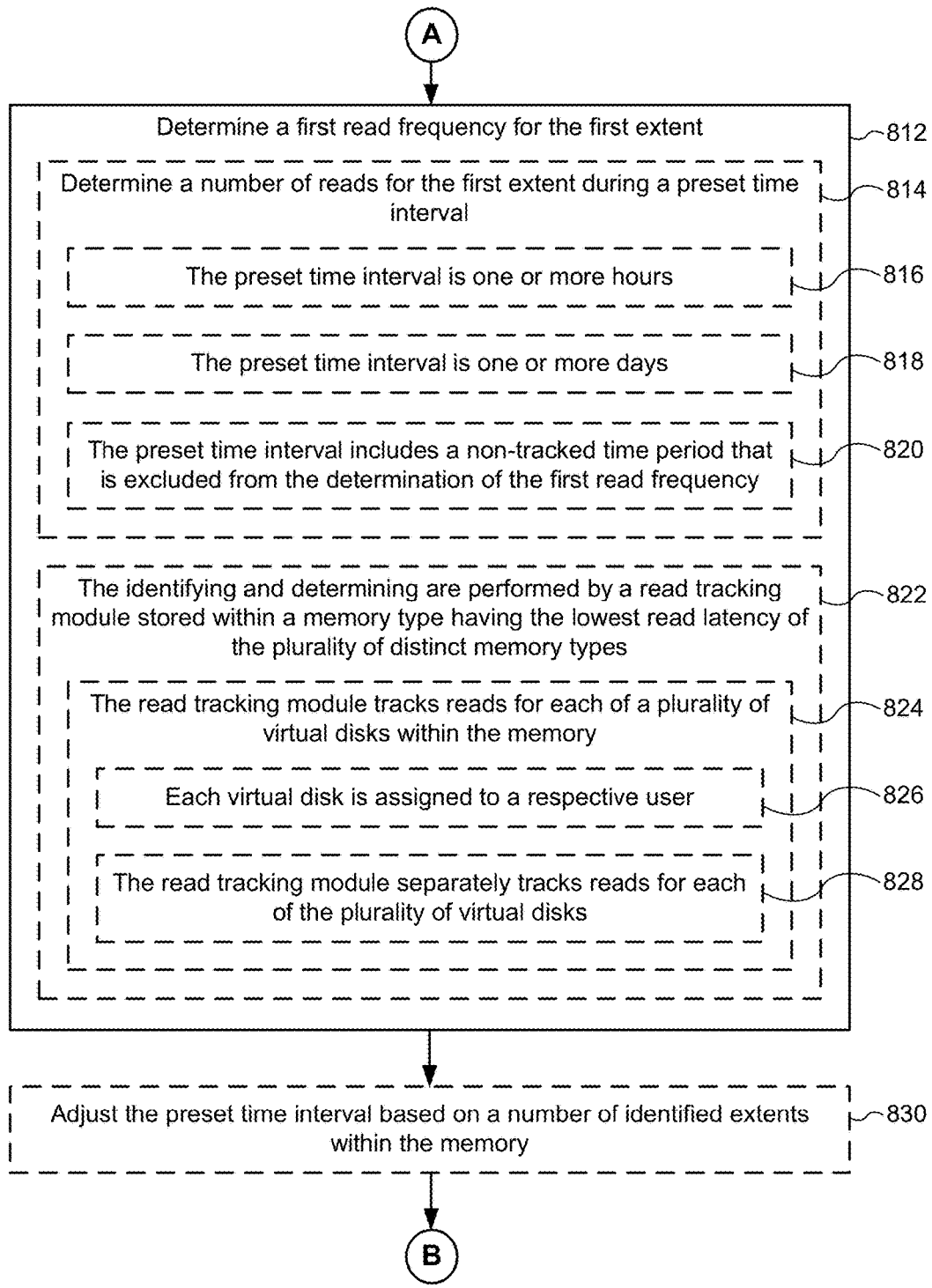
Figure 8C:
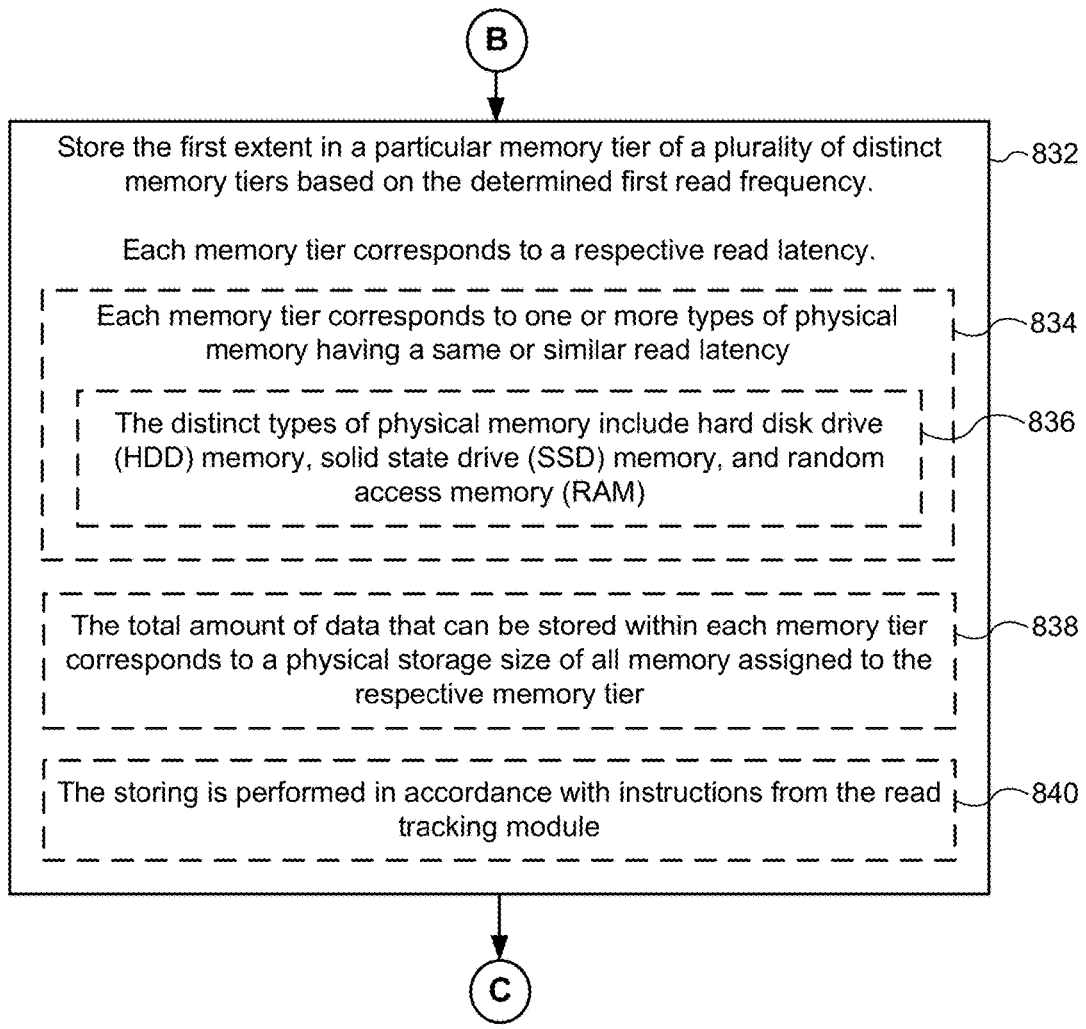
Figure 8D:
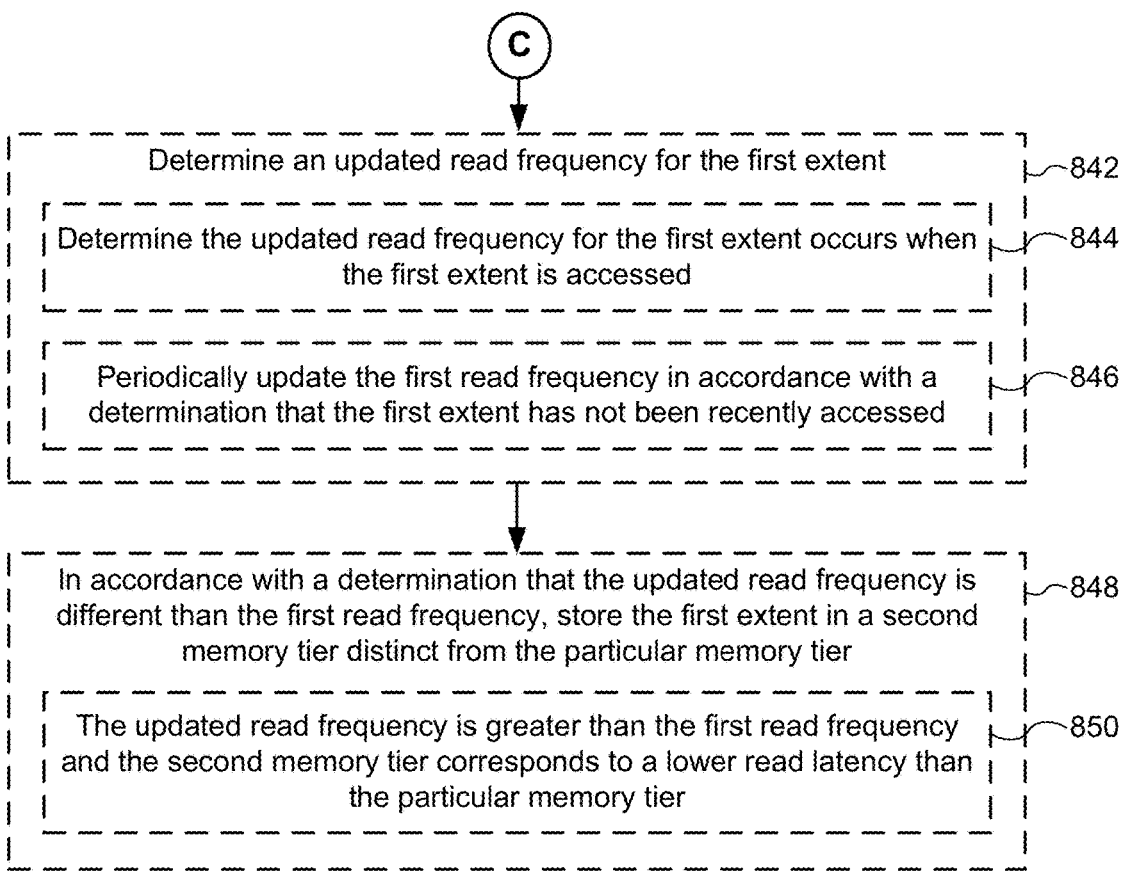
Figure 8E:
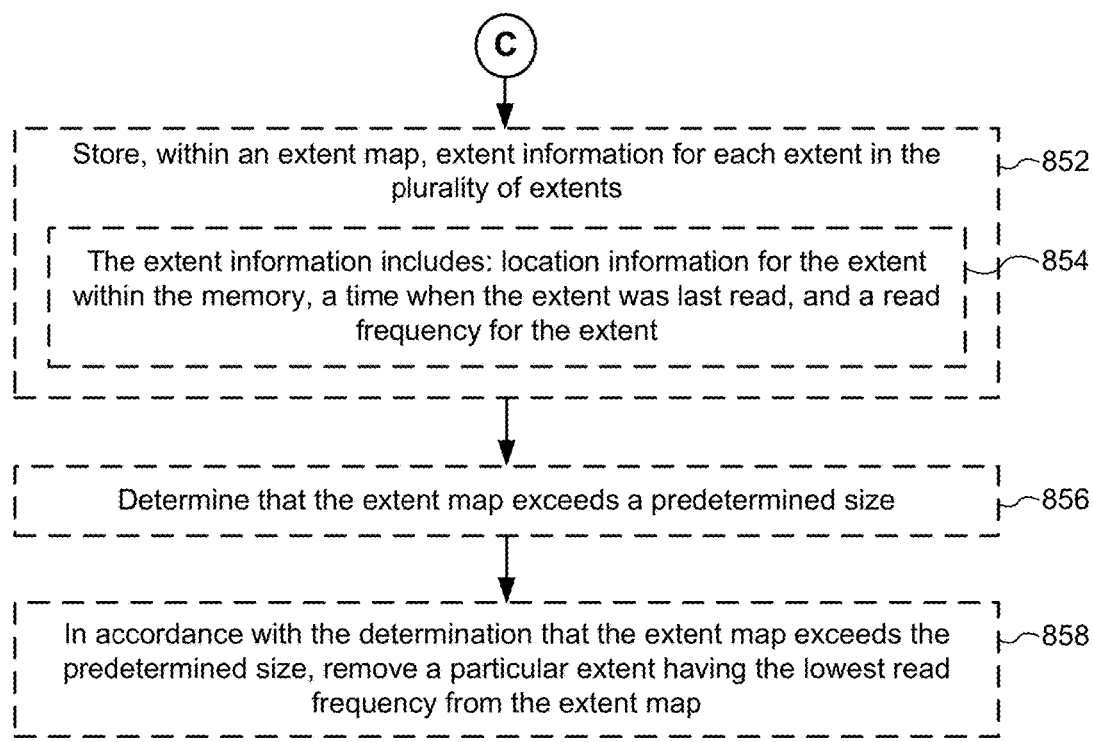
Figure 8F:
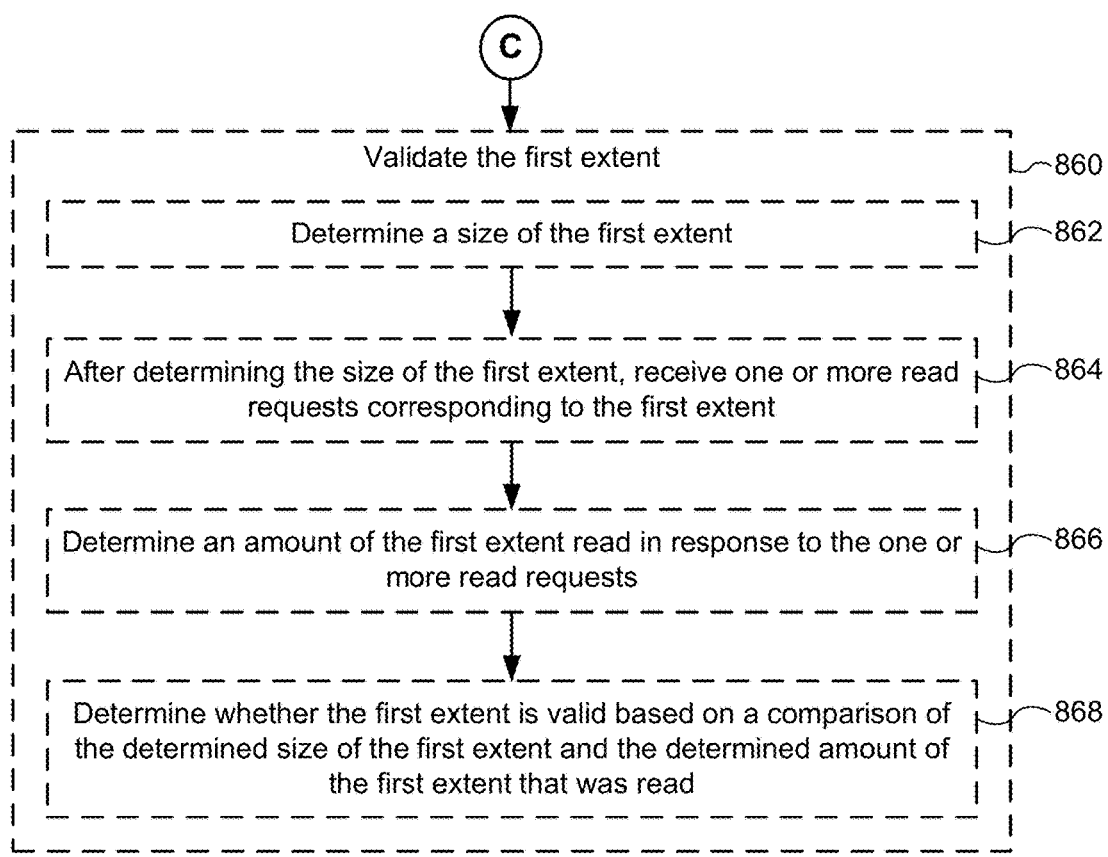

FIGS. 7A-7C illustrate a process of updating an extent map, in accordance with some implementations. FIG. 7A shows a process in which a read frequency for an extent within the extent map 222 is updated and the extent is moved to another frequency level as a result. In FIG. 7A, the extent map 222 includes the extents 602 through 642 in ascending order at a first time (denoted extent map 222-a). In the extent map 222-a the extent 610 is assigned to frequency level 2. Then a read request is obtained for extent 610. As a result, the read frequency for extent 610 is updated. The updated read frequency results in a re-rank of the extents within the extent map 222. The re-rank includes the extent 610 being assigned to frequency level 1 rather than frequency level 2 and rising to position 4. Thus, at a second time after the update, frequency level 1 now includes extend 610 and frequency level 2 no longer includes extend 610.

FIG. 7B shows a process in which the read frequency for the extent 610 is updated as in FIG. 7A, and shows that the extent 610 is stored in a different cache tier as a result. In FIG. 7B, the extent map 222 includes the extents 602 through 642 in ascending order at a first time (denoted extent map 222-a). In the extent map 222-a the extent 610 is stored in cache tier 2 and the extent 606 is stored in cache tier 1. Then the read request is obtained for extent 610. As a result, the read frequency for extent 610 is updated. The updated read frequency results in the extent 610 being (assigned to frequency level 1 and) stored in cache tier 1 rather than cache tier 2. The updated read frequency results in a re-rank of the extents within the extent map 222. The re-rank includes the extent 610 rising to position 3 and extents 606 and 608 shifting down accordingly. At a second time, after the re-rank, the extent 610 is stored in cache tier 1 and the extent 606 is reassigned to cache tier 2, as shown in the extent map 222-b.

In some implementations, moving the extent 610 from cache tier 2 to cache tier 1 includes storing the extent in cache tier 1 and subsequently deleting or overwriting the extent 610 from cache tier 2. While FIG. 7A shows each cache tier having a same number of extents before and after the re-rank of extent 610, in some instances, the number of extents in a cache tier changes due to the variable sizes of the extents. For example, a cache tier has a capacity of 1 GB and initially includes 3 extents with sizes 200 MB, 500 MB, and 250 MB. After a re-rank the cache tier includes 4 extents with sizes 200 MB, 250 MB, 300 MB, and 220 MB.

FIG. 7C shows a process in which a new extent is added to the extent map 222. In FIG. 7B the extent map 222 initially includes extent 602 through extent 642 (denoted extent map 222-b). Then a new extent 644 is identified and added to the extent map 222. In accordance with some implementations, an extent having a low or lowest relative read frequency, extent 642, is expelled from the extent map 222 to make room for the new extent 644. In some implementations, the extent having the least recent last read timestamp is expelled. Thus, the extent map after the addition and expulsion (extent map 222-c) includes extent 644, but not extent 642.

In some implementations, the extent map 222 is assigned a maximum size and, when a new extent is to be added, one or more extents are expelled to ensure that the extent map with the new extent added is at or below the maximum size. In some implementations, expelling an extent comprises overwriting the extent information of the expelled extent with extent information of another extent within the extent map. In some implementations, an extent with the lowest read frequency is expelled. In some implementations, an extent within the bottom cache tier (e.g., the cache tier having the highest read latency) is expelled based on the size of the extent and/or the last read timestamp of the extent. In some implementations, extents are expelled from the extent map in accordance with the extents having not been read within a predetermined time period (e.g., not read within the last 12 hours, 24 hours, or 72 hours).

Representative Processes

Attention is now directed to the flowchart representations of FIGS. 8A-8F. FIGS. 8A-8F illustrate a flowchart representation of a method for caching data, in accordance with some implementations. In some implementations, the method 800 is performed by: (1) one or more servers of a server system, such as the server(s) 106, FIG. 1; (2) one or more components of a server 106, such as the read tracker module 216 of FIG. 2A and/or a virtual machine 252 of FIG. 2B; or (3) a combination thereof. In some implementations, the operations of the method 800 described herein are entirely interchangeable, and the operations are performed by any of the aforementioned devices, systems, or combination of devices and/or systems. In some embodiments, the method 800 is governed by instructions that are stored in a non-transitory computer-readable storage medium and that are executed by one or more processors of a device/computing system, such as the one or more CPU(s) 202 of a server 106. For clarity, the operations detailed below are described as being performed by a storage server (e.g., a server 106).

A storage server includes one or more processors and memory, the memory including a plurality of distinct memory types each assigned to a respective memory tier of a plurality of memory tiers based on a read latency, or read time, of the memory type. For example, the highest tier corresponds to RAM having the lowest relative read latency, a middle tier corresponds to an SSD having medium relative read latency, and the lowest tier corresponds to an HDD having a high relative read latency. In some implementations, one or more of the memory tiers are utilized solely, or primarily, for caching. In some implementations, the plurality of memory tiers comprises a plurality of cache tiers (e.g., cache tiers 300, FIG. 3).

The storage server identifies (802) a plurality of extents, including a first extent, where each extent includes a respective set of related data stored within the memory. In some implementations, the storage server utilizes read tracker module 216 (FIG. 2A) to identify the plurality of extents. In some implementations, the storage server identifies each extent of the plurality of extents in accordance with read requests received for memory blocks comprising the respective extent. In some implementations, identifying a particular extent of the plurality of extents includes the process illustrated in FIG. 5. In some implementations, the storage server identifies at least a subset of the plurality of extents using an extent map (e.g., extent map 222, FIG. 2A).

In some implementations, the storage server determines (804) which memory blocks are being read close in time, and whether the memory blocks being read close in time are located close to one another within the memory. For example, in the process illustrated by FIG. 5 read requests #1, #2, #5, #7, and #8 are read close in time and correspond to memory locations close to one another (memory blocks 1-5). In another example, the data comprising the extent is contiguous in memory and accessed during a small time window (e.g., 2, 5, 10 seconds). In some implementations, each subsequent read request that is close in time and in memory extends the time window by a set amount (e.g., 1, 2, or 5 seconds).

In some implementations, the storage server identifies (806) a plurality of data blocks as the first extent. For example, in FIG. 5 the storage server identifies memory blocks 1-5 as extent 502.

In some implementations, the storage server increments (808) the number of reads after access of one or more of the data blocks (e.g., in response to a read request for the one or more data blocks). For example, a number of reads (e.g., sequential reads or reads within a particular time window) are used to read the entire extent and the number of sequential reads are counted as a single read of the entire extent. In some implementations, the plurality of reads of various components of the first extent are counted as a single read if the plurality of reads occurs within a preset time window (e.g., 2, 5, 10 seconds). In some implementations, the storage server increments the number of reads for a particular extent in response to access of only a subset of the data blocks comprising the extent.

In some implementations, the plurality of extents includes (810) a second extent larger than the first extent. For example, the first extent encompasses 1 MB of data and the second extent encompasses 10 MB of data. In some implementations, the plurality of extents includes a third extent smaller than the first extent. In some implementations, the plurality of extents includes a fourth extent having a same size as the first extent.

The storage server determines (812) a first read frequency for the first extent. In some implementations, the read frequency is determined as shown above in Table 1. In some implementations, the read frequency is determined based on a number of times one or more blocks of the first extent are read during a preset time interval. In some implementations, the storage server assigns the first extent to a first frequency level of a plurality of frequency levels based on the determined first read frequency.

In some implementations, the storage server determines (814) a number of reads for the first extent during a preset time interval. In some implementations, the preset time interval is (816) one or more hours. In some implementations, the preset time interval is (818) one or more days. For example, a number of reads per 2 hours, per 12 hours, or per day. In some implementations, the preset time interval is determined based at least in part on a maximum size allotted for the extent map and/or the respective read frequency of extents expelled from the extent map.

In some implementations, the preset time interval includes (820) a non-tracked time period that is excluded from the determination of the first read frequency. For example, the read tracker is disabled during an archiving time period and thus reads occurring during the archiving time period are excluded or ignored when determining a read frequency for the extent. In some implementations, the duration of the non-tracked time period is subtracted from the preset time interval. For example, the preset time interval is 24 hours and includes a 1-hour non-tracked period, thus the effective time interval used for calculating the frequency is 23 hours.

In some implementations, the identifying and determining are performed (822) by a read tracker module (e.g., read tracker module 216, FIG. 2A) stored within a memory type having the lowest read latency of the plurality of distinct memory types. For example, the storage server includes flash memory having the lowest read latency of any memory type on the storage server, and the read tracker module is stored in the flash memory. In some implementations, the read tracker module is stored in volatile memory (e.g., RAM). In some implementations, the read tracker module is stored in non-volatile memory (e.g., the non-volatile memory having the lowest read latency of all non-volatile memory in the storage server).

In some implementations, the read tracker module tracks (824) reads for each of a plurality of virtual disks within the memory. For example, a read tracker module tracks reads for virtual disks 215-1 through virtual disk 215-M in FIG. 2A. In some implementations, a distinct read tracker module is assigned to each virtual disk (e.g., read tracker module 216-1 through read tracker module 216-M in FIG. 2A).

In some implementations, each virtual disk is assigned (826) to a respective user. For example, in accordance with some implementations, virtual disk 215-1 is assigned to a first user and virtual disk 215-M is assigned to a second user distinct from the first user. In some implementations, a user comprises a particular person. In some implementations, each virtual disk is assigned to a respective user account (e.g., accessible by a person or group of persons).

In some implementations, the read tracker module separately tracks (828) reads for each of the plurality of virtual disks. For example, a read tracker module separately tracks reads for each virtual disk 215-1 through 215-M in FIG. 2A. In some implementations, separately tracking reads includes maintaining a respective extent map for each virtual disk. In some implementations, separately tracking reads includes ensuring that potential extents do not span multiple virtual disks.

In some implementations, the storage server adjusts (830) the preset time interval based on a number of identified extents within the memory. In some implementations, the preset time interval is adjusted based on an amount of physical memory blocks encompassed by the identified extents. In some implementations, the preset time interval is adjusted based on one or more characteristics of the identified extents (e.g., the total size of the extents, the read frequencies of the extents, the amount of extent information in the extent map, and the like). In some implementations, the preset time interval is adjusted based on a size of the extent map. For example, the size of the extent map exceeds a size threshold for the extent map and the preset time interval is decreased accordingly. In some implementations, the preset time interval is adjusted based on the read frequency of extents expelled or discarded from the extent map. For example, if the average read frequency of expelled extents is greater than the preset time interval then the preset time interval is increased. If the average read frequency of expelled extents is less than the preset time interval then the preset time interval is decreased.

The storage server stores (832) the first extent in a particular memory tier of a plurality of distinct memory tiers based on the determined first read frequency, where each memory tier corresponds to a respective read latency. For example, the first extent is determined to have a higher read frequency than other identified extents and thus the first extent is stored in the memory tier having the lowest read latency. In some implementations, storing the first extent in the particular memory tier includes discarding the first extent from a second memory tier. In some implementations, the first extent is stored within a database (e.g., on an HDD) and is duplicated to the particular memory tier (e.g., duplicated in a flash memory cache). Thus, in accordance with some implementations, the first extent is stored in multiple locations with the storage server's memory.

In some implementations, each memory tier corresponds to (834) one or more types of physical memory having a same or similar read latency. For example, a first cache tier corresponds to flash memory and an SSD having similar read latencies, where the latencies are lower than latencies of a second cache tier corresponding to one or more other types of SSDs. As another example, FIG. 3 shows cache tiers 300 with tiers 1 through 4 each corresponding to a distinct type of physical memory in accordance with some implementations. In some implementations, each distinct type of physical memory is associated with a distinct read latency.

In some implementations, the distinct types of physical memory include (836) hard disk drive (HDD) memory, solid state drive (SSD) memory, and random access memory (RAM). For example, FIG. 3 shows tier 1 including RAM, tier 2 including a first type of SSD, and tier 3 including a second type of SSD. In some implementations, a particular memory tier includes two or more memories of a particular type (e.g., two SSDs) that optionally have differing (but similar) read latencies.

In some implementations, the total amount of data that can be stored within each memory tier corresponds to (838) a physical storage size of all memory assigned to the respective memory tier. For example, a particular memory tier includes a 200 GB SSD, a 300 GB SSD, and 64 GB of additional flash memory. Thus, the total amount of data that can be stored within the particular memory tier is 564 GB.

In some implementations, the storing is performed (840) in accordance with instructions from the read tracker module. For example, the read tracker module (e.g., read tracker module 216, FIG. 2A) directs caching module 218 to store the first extent in the particular memory tier. In some implementations, the read tracker module directs a caching module assigned to the particular memory tier (or assigned a particular memory device within the particular memory tier) to perform the storing operation. In some implementations, the read tracker module facilitates storage of the first extent within a particular cache or cache tier. In some implementations, the read tracker module maintains an extent map of extents which each extent assigned to a frequency level. In some implementations, the read tracker module supplies the extent map to the caching module(s) and each caching module caches a subset of the extents based on the assigned frequency levels. In some implementations, the read tracker module facilitates storage of the first extent within the particular cache (or cache tier) by mapping the assigned frequency levels to the cache tiers. For example, frequency level 1 and frequency level 2 map to cache tier 1, frequency level 3 maps to cache tier 2, and frequency level 4 and a portion of frequency level 5 map to cache tier 3.

In some implementations, the storage server determines (842) an updated read frequency for the first extent. In some implementations, after determining the read frequency for the first extent, the read tracker module determines an updated read frequency based on one or more additional read requests for data of the first extent. In some implementations, the storage server determines (844) the updated read frequency for the first extent when the first extent is accessed. For example, in the process illustrated by FIG. 4 the read tracker module obtains (410) a read request and updates (422) a read frequency for the corresponding extent. In some implementations, the read tracker module assigns a frequency level to the first extent based on the updated read frequency.

In some implementations, the storage server periodically updates (846) the first read frequency in accordance with a determination that the first extent has not been recently accessed. For example, the storage server decreases the read frequency for extents that have not been accessed since the last periodic update, or have not been accessed within a set amount of time (e.g., 1 hour, 2 hours, or 6 hours). In some implementations, the storage server determines the time of last access for each extent based on the last read timestamp (e.g., last read timestamp 652, FIG. 6). In some implementations, the periodic updates comprise an ageing process that runs at set intervals (e.g., once per hour, once per 12 hours, once per day) and lowers the read frequency for extents based on the last read time for the extent.

In some implementations, in accordance with a determination that the updated read frequency is different than the first read frequency, the storage server stores (848) the first extent in a second memory tier distinct from the particular memory tier. For example, in the process illustrated by FIG. 7B the read frequency for extent 610 is updated and the extent is moved from cache tier 2 to cache tier 1 as a result. In some implementations, the storage server moves a second extent from a first memory tier to a second memory tier in accordance with a determination that the updated read frequency for the first extent is different from the first read frequency. For example, in the process illustrated by FIG. 7B the read frequency for extent 610 is updated and extent 606 is moved from cache tier 1 to cache tier 2 as a result. In some instances and implementations, the second extent is moved even though the read frequency for the second extent is unchanged (e.g., moved as a result of a re-ranking of the extents in the extent map).

In some implementations, the updated read frequency is greater than (850) the first read frequency and the second memory tier corresponds to a lower read latency than the particular memory tier. For example, in accordance with some implementations, the updated read frequency for extent 6010 in FIG. 7B is greater than the first read frequency and the extent 610 is moved from cache tier 2 (e.g., having a medium read latency) to cache tier 1 (e.g., having a lowest read latency).

In some implementations, the storage server stores (852), within an extent map (e.g., extent map 222), extent information for each extent in the plurality of extents. In some implementations, the extent map is stored in a read tracker module (e.g., within RAM). In some implementations, the extent map is stored within the cache tier having the lowest read latency. In some implementations, the extent map is stored in memory that is not part of the caching hierarchy.

In some implementations, the extent information includes (854): location information for the extent within the memory, a time when the extent was last read, and a read frequency for the extent (or a subset thereof). For example, FIG. 6 shows extent information for the extent 618 as including memory location information 650, a last read timestamp 652, and read frequency information 654. In some implementations, a particular extent is stored in multiple locations within the memory and the extent location information includes a reference to each location. In some implementations, the extent information includes information regarding a virtual disk where a particular extent resides. In some implementations, the extent information includes a timestamp of each read request for the extent during a particular time period. In some implementations, the location information includes a start and end location for the extent. In some implementations, the location information includes a start location and size of the extent.

In some implementations, the storage server determines (856) that the extent map exceeds a predetermined size. For example, the server has allocated 50 GB for the extent map and the extent map is utilizing 51 GB. In some implementations, the storage server determines whether an update to the extent map would result in the extent map exceeding a predetermined size (e.g., an update resulting from the identification of a new extent).

In some implementations, in accordance with the determination that the extent map exceeds the predetermined size, the storage server removes (858) a particular extent having the lowest read frequency (or assigned to the lowest frequency tier) from the extent map. For example, the server determines that the extent map exceeds a 50 GB limit and removes the particular extent in accordance with that determination. In some implementations, the storage server determines that an update to the extent map would result in the extent map exceeding a predetermined size, and removes the particular extent in accordance with that determination. For example, the server identifies a new extent and determines that adding the new extent information to the extent map would cause the extent map to exceed a maximum size. In this example, the server removes the particular extent from the extent map (e.g., disregards or deletes the corresponding extent information) prior to adding the new extent information. In accordance with some implementations, FIG. 7C illustrates a process where extent 642 is removed from the extent map to make room for the addition of new extent 644. In some implementations, the rate at which extents are removed from the extent map affects the preset time interval used for the read frequency calculation. For example, if extents are being removed from the extent map at a high rate, the preset time interval will be lowered (e.g., from 1 day to 12 hours). If the extents are being removed from the extent map at a low rate, the preset time interval will be increased (e.g., from 1 day to 2 days). In some implementations, the average read time of the extents being removed affects the preset time interval.

In some implementations, the storage server validates (860) the first extent. In some implementations, the storage server validates the first extent in response to a read request or write request corresponding to the first extent. In some implementations, the storage server validates the first extent in response to each read request. In some implementations, the storage server validates the first extent at particular time intervals. In some implementations, validating the first extent includes determining whether the first extent has been overwritten with two or more unrelated sets of data.

In some implementations, the validation includes determining (862) a size of the first extent. In some implementations, the size of the first extent is determined when the first extent is initially identified. In some implementations, the size of the first extent is determined based on the memory location information (e.g., memory location information 650) for the first extent in the extent map (e.g., extent map 222).

In some implementations, the validation includes, after determining the size of the first extent, receiving (864) one or more read requests corresponding to the first extent. For example, the size of the first extent is determined when the first extent is initially identified and subsequently the first extent is read one or more times.

In some implementations, the validation includes determining (866) an amount of the first extent read in response to the one or more read requests. In some implementations, the storage server determines the amount of the first extent read in response to the read requests by tracking read requests accessing portions of the first extent during a particular time interval. For example, a first read request accesses a first memory block of the first extent. In response, the server determines whether other portions of the first extent are accessed during a time interval after the first read request (e.g., a time interval of 5, 10, or 15 seconds after the first read request is obtained). In some implementations, each subsequent read request accessing a portion of the first extent extends the time interval by a set amount (e.g., 2, 5, or 10 seconds).

In some implementations, the validation includes determining (868) whether the first extent is valid based on a comparison of the determined size of the first extent and the determined amount of the first extent that was read. In some implementations, the first extent is determined to be valid in accordance with a determination that the size of the first extent equals the determined amount of the first extent that was read. In some implementations, the first extent is determined to be invalid in accordance with a determination that the difference between size of the first extent and the determined amount of the first extent that was read exceeds a preset threshold (e.g., more than 1, 10, or 100 memory blocks). In some implementations, the first extent is determined to be invalid in accordance with a determination that less than a threshold percentage of the first extent was read (e.g., less than 50%, 75%, or 95%).

In some implementations, in accordance with a determination that the first extent is invalid, the first extent is removed from the extent map. In some implementations, in accordance with a determination that the first extent is invalid, the extent information for the first extent in the extent map deleted, disregarded, and/or overwritten. In some implementations, in accordance with a determination that the first extent is invalid, the read portion of the first extent is denoted as a new extent, and optionally the remainder of the first extent is discarded. In some implementations, in accordance with a determination that the first extent is valid, storage server forgoes removing the first extent from the extent map.

It should be understood that the particular order in which the operations in FIGS. 8A-8F have been described is merely an example and is not intended to indicate that the described order is the only order in which the operations could be performed. One of ordinary skill in the art would recognize various ways to reorder the operations described herein. Additionally, it should be noted that details of other processes described herein are also applicable in an analogous manner to the method 800 described above with respect to FIGS. 8A-8F.

It will also be understood that, although the terms first, second, etc. are, in some instances, used herein to describe various elements, these elements should not be limited by these terms. These terms are only used to distinguish one element from another. For example, a first extent could be termed a second extent, and, similarly, a second extent could be termed a first extent, without departing from the scope of the various described implementations.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A computing system comprising:
    memory comprising a plurality of memory blocks and including a plurality of distinct memory types each assigned to a respective memory tier of a plurality of memory tiers based on a read latency of the memory type;
    a plurality of caching modules, each caching module of the plurality of caching modules configured to govern data caching for a respective memory type of the plurality of distinct memory types; and
    a read tracker module coupled. to the memory and the plurality of caching modules, the read tracker module configured to:
        receive physical memory addresses for data read requests to the memory;
        identify, based on the physical memory addresses, sets of related data by determining whether memory blocks of the plurality of memory blocks are being read close in time and are physically located close to one another within the memory;
        associate the identified sets of related data with a plurality of extents;
        determine a respective read frequency for each of the plurality of extents;
        update an extent map for the plurality of extents, wherein the extent map includes a ranking of the plurality of extents, and the ranking is determined based on the respective read frequency of each of the plurality of extents; and
        govern caching of the plurality of extents within the memory, including directing a particular caching module of the plurality of caching modules to store each of the plurality of extent within a respective memory tier of the plurality of memory tiers based on the updated extent map.

2. The computing system of claim 1, wherein the plurality of distinct memory types comprises a plurality of distinct types of physical memory.

3. The computing system of claim 2, wherein the plurality of distinct types of physical memory includes hard disk drive (HDD) memory, solid state drive (SSD) memory, and random access memory (RAM).

4. The computing system of claim 2, wherein the total amount of data that can be stored within each memory tier corresponds to a physical storage size of all memory assigned to the respective memory tier.

5. The computing system of claim 1, wherein the plurality of extents includes a second extent that is lamer than a first extent.

6. The computing system of claim 1, wherein the memory is partitioned into a plurality of virtual disks, and wherein the read tracker module tracks reads for each of the plurality of virtual disks.

7. The computing system of claim 6, wherein each virtual disk of the plurality of virtual disks is assigned to a respective user.

8. The computing system of claim 6, wherein the read tracker module separately tracks reads for each of the plurality of virtual disks.

9. The computing system of claim 1, wherein the read tracker module assigns each of the plurality of extents to a respective frequency level of a plurality of frequency levels based on the respective read frequency.

10. A method for caching data, comprising:
    at a computing system having one or more processors and memory, the memory comprising a plurality of memory blocks and including a plurality of distinct memory types each assigned to a respective memory tier of a plurality of memory tiers based on a read latency of the memory type:
        receiving physical memory addresses for data read requests to the memory;
        identifying, based on the physical memory addresses, sets of related data by determining whether memory blocks of the plurality of memory blocks are being read close in time and are Physically located close to one another within the memory;
        associate the identified sets of related data with a plurality of extents;
        determining a respective read frequency for each of the plurality of extents;

updating an extent map for the plurality of extents, wherein the extent map includes a ranking of the plurality of extents, and the ranking is determined based on the respective read frequency of each of the plurality of extents; and storing the plurality of extents within the memory, including directing a particular caching module of a plurality of caching modules to store each of the plurality of extent within a respective memory tier of the plurality of memory tiers based on the updated extent map.

11. The method of claim 10, Wherein determining the respective read frequency for each extent comprises determining a number of reads for a first extent during a preset time interval.

12. The method of claim 11, wherein the preset time interval is one or more hours.

13. The method of claim 11, wherein the preset time interval is one or more days.

14. The method of claim 11, further comprising adjusting he preset time interval based on a number of identified extents within the memory.

15. The method of claim 11, wherein the preset time interval includes a:

non-tracked time period that is excluded from the determination of a first read frequency.

16. The method of claim 11, wherein the first extent comprises a plurality of data blocks; and wherein determining the number of reads for the first extent comprises incrementing the number of reads after access of one or more of the data blocks.

17. The method of claim 10, the plurality of extents including a first extent that has a first read frequency and is stored in a first memory tier, the method further comprising, after storing the plurality of extents in the respective memory tier:

determining an updated read frequency for the first extent; and in accordance with a determination that the updated read frequency is different than the first read frequency, storing the first extent in a second memory tier of the plurality of memory tiers;

wherein the second memory tier is distinct from the first memory tier.

18. The method of claim 17, wherein the updated read frequency is greater than the first read frequency and the second memory tier corresponds to a lower read latency than the first memory tier.

19. The method of claim 17, wherein determining the updated read frequency for the first extent occurs when the first extent is accessed.

20. The method of claim 17, further comprising:

periodically updating the first read frequency in accordance with a determination that the first extent has not been recently accessed.

21. The method of claim 10, further comprising storing, within an extent map, extent information for each extent in the plurality of extents.

22. The method of claim 21, wherein the extent information includes:

location information for the extent within the memory, a time when the extent was last read, and
a read frequency for the extent.

23. The method of claim 21, further comprising:

determining that the extent map exceeds a predetermined size; and in accordance with the determination that the extent map exceeds the predetermined size, removing a particular extent of the plurality of extents from the extent map, wherein the particular extent has the lowest read frequency.

24. The method of claim 10, wherein the identifying and determining are performed by a read tracker module.

25. The method of claim 24, wherein the read tracker module is stored within a memory type having the lowest read latency of the plurality of distinct memory types.

26. The method of claim 24, wherein the storing is performed in accordance with instructions from the read tracker module.

27. The method of claim 10, further comprising validating a first extent, the validating comprising:

determining a size of the first extent;

after determining the size of the first extent, receiving one or more read requests corresponding to the first extent;

determining an amount of the first extent that is read in response to the one or more read requests; and determining whether the first extent is valid based on a comparison of the determined size of the first extent and the determined amount of the first extent that was read.

28. A computer-readable storage medium storing one or more programs, the one or more programs comprising instructions, which when executed by a computing system having memory comprising a plurality of memory blocks and including a plurality of distinct memory types each assigned to a respective memory tier of a plurality of memory tiers based. on a read latency of the memory type, cause the system to:

receive physical memory addresses for data. read requests to the memory;

identify, based on the physical memory addresses, sets of related data by determining whether memory blocks of the plurality of memory blocks are being read close in time and are physically located close to one another within the memory;

associate the identified sets of related data with a plurality of extents;

determine a respective read frequency for each of the plurality of extents;

update an extent map for the plurality of extents, wherein the extent map includes a ranking of the plurality of extents, and the ranking is determined based on the respective read frequency of each of the plurality of extents; and store the plurality of extents within the memory, including directing a particular caching module of a plurality of caching modules to store each of the plurality of extents within a respective memory tier of the plurality of memory tiers based on the updated extent map.

* * * * *